United States Patent
Suzuki et al.

[11] Patent Number: 5,341,165
[45] Date of Patent: Aug. 23, 1994

[54] SCANNING CONTROLLER FOR COLOR ELECTROPHOTOGRAPHIC APPARATUS

[75] Inventors: Hiroyuki Suzuki, Machida; Yukio Nagase, Kawasaki; Kazuhisa Kemmochi, Machida, all of Japan

[73] Assignee: Canon Kabushiki Kaisha, Tokyo, Japan

[21] Appl. No.: 818,767

[22] Filed: Jan. 13, 1992

[30] Foreign Application Priority Data

Jan. 16, 1991 [JP] Japan ................. 3-003246
Nov. 18, 1991 [JP] Japan ................. 3-329444

[51] Int. Cl.$^5$ .................. G01D 15/06; G01D 15/14
[52] U.S. Cl. .......................... 346/157; 346/160
[58] Field of Search ............ 346/157, 160, 107 R, 346/108

[56] References Cited

U.S. PATENT DOCUMENTS

| | | | |
|---|---|---|---|
| 4,792,860 | 12/1988 | Kuehrle | 358/300 |
| 4,811,037 | 3/1989 | Arai | 346/108 |
| 4,864,326 | 9/1989 | Kawamura et al. | 346/108 |
| 4,914,455 | 4/1990 | Hayes | 346/154 |
| 5,126,839 | 6/1992 | Sugiura | 358/80 |
| 5,194,878 | 3/1993 | Murakami et al. | 346/108 |

*Primary Examiner*—Benjamin R. Fuller
*Assistant Examiner*—Randy W. Gibson
*Attorney, Agent, or Firm*—Fitzpatrick, Cella, Harper & Scinto

[57] ABSTRACT

A color electrophotographic apparatus includes a photosensitive member movable along an endless path; a charger for charging the photosensitive member; a scanning optical system for scanning the photosensitive member having been charged by the charger with information light responsive to color signals; a controller for controlling an exposure amount of the photosensitive member by the scanning optical system; a transfer device for simultaneously transferring toner images formed superposedly on the photosensitive member; wherein the controller controls the optical scanning system in consideration of transmissivity of the light through the toner.

7 Claims, 13 Drawing Sheets

FIG. 4B PRESENT INVENTION

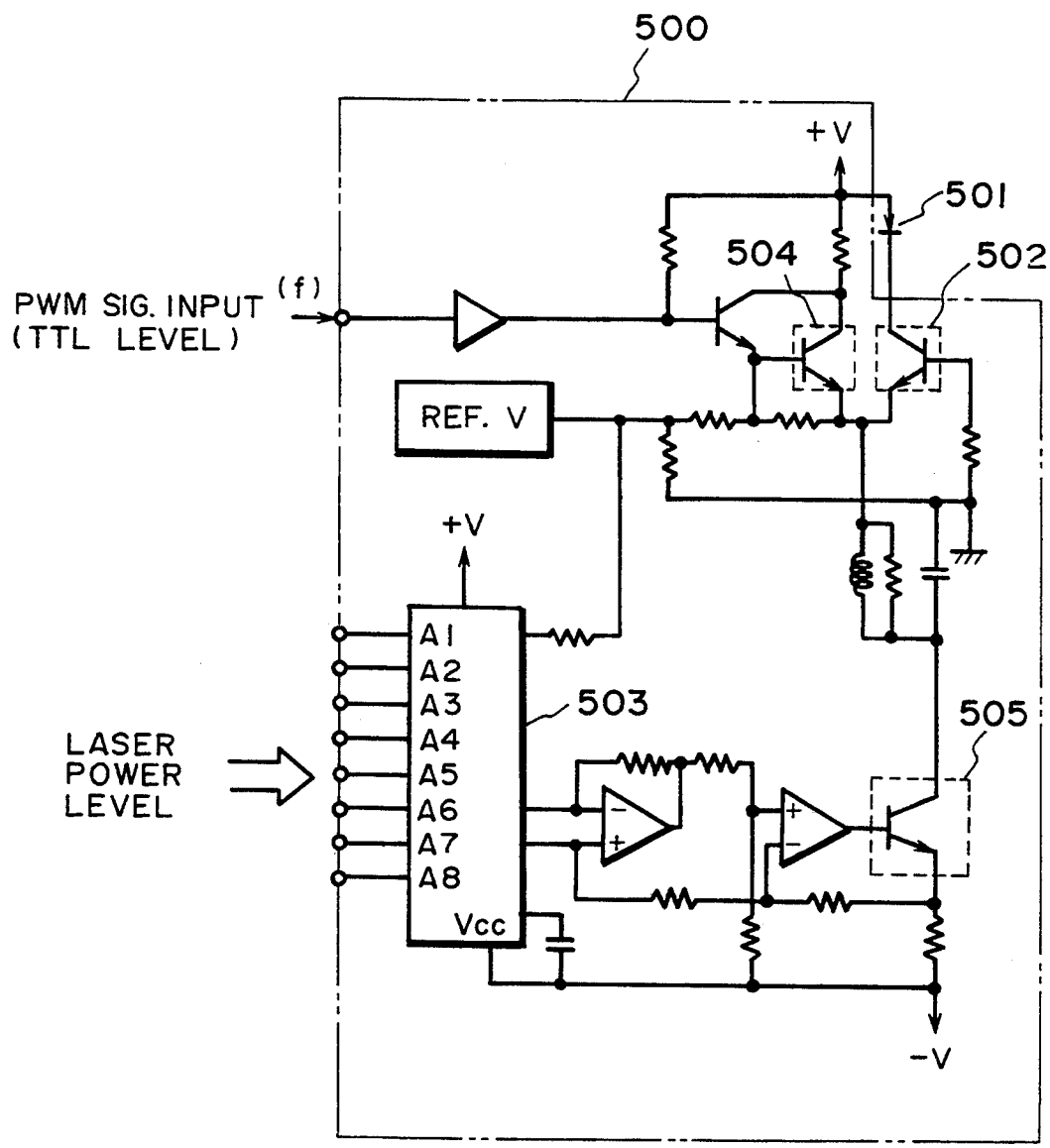
F I G. 8

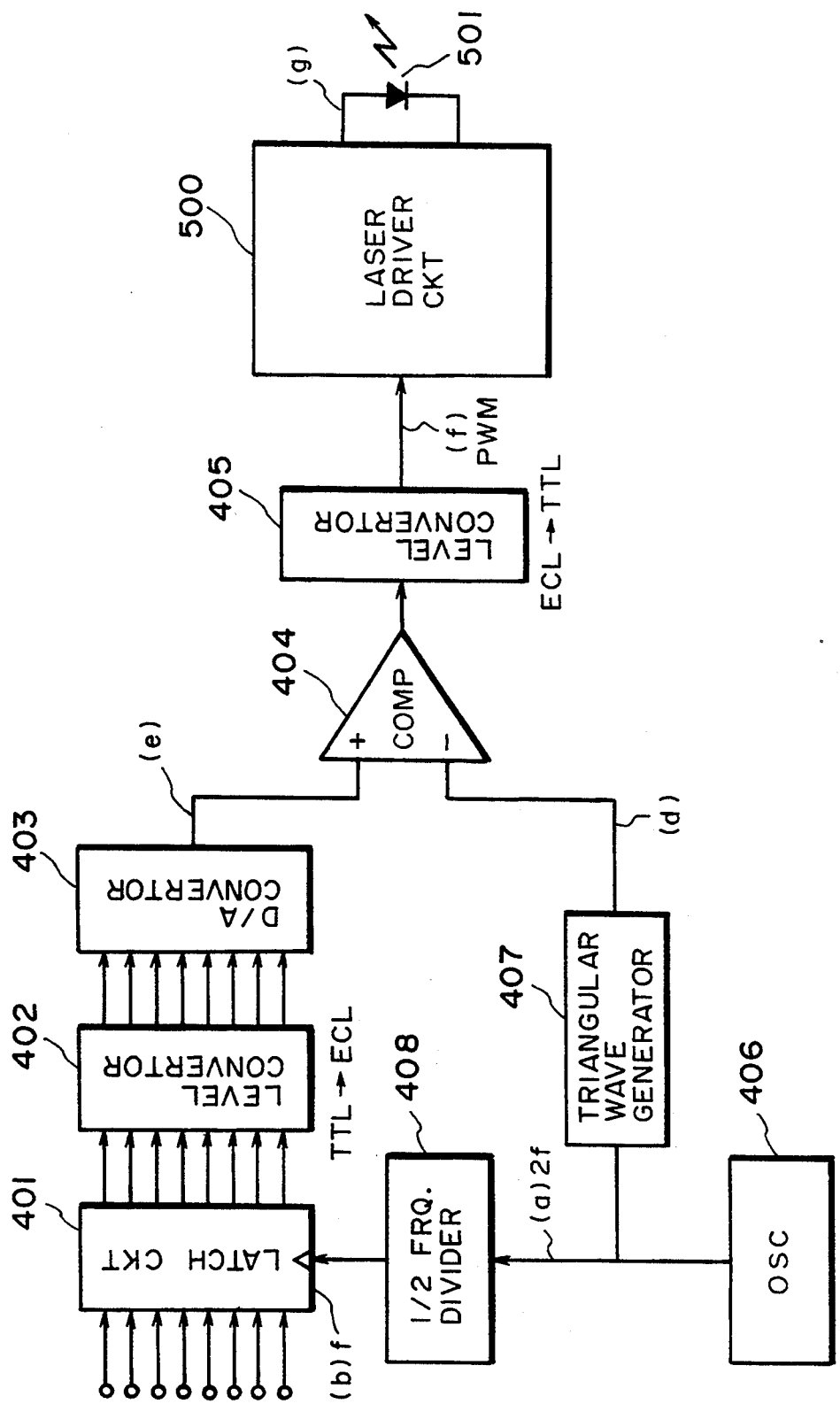
F I G. 9

SCANNING CONTROLLER FOR COLOR ELECTROPHOTOGRAPHIC APPARATUS

FIELD OF THE INVENTION AND RELATED ART

The present invention to a multi-color image forming apparatus such as a copying apparatus or printer of an electrophotographic type or electrostatic recording type, capable of forming a multi-color image including full-color images.

In a known electrophotographic apparatus, there are provided a plurality of developing devices containing different color developers (toners), and charging, exposing and developing steps are performed sequentially to form a visualized multi-color image on an image bearing member in the form of a photosensitive drum through one or more recording process cycles. The multi-color image is simultaneously transferred onto a recording material and is fixed thereon, so that a desired multi-color image is produced.

FIG. 5 shows an example of a color laser beam printer as an example of such a multi-color image forming apparatus.

The color laser beam printer is provided with a photosensitive drum 1 having a conductive base in the form of a drum and a photoconductive layer thereon. The photosensitive drum 1 normally rotates in the direction indicated by an arrow. Around the photosensitive drum 1 there are provided along the rotational direction a charger 2 for uniformly charging the photosensitive drum 1, four developing devices 31, 32, 33 and 34 (first, second, third and fourth, or magenta, cyan, yellow and black developing devices) containing different color developers (toners), image transfer means 4 for transferring the toner image after the development onto the recording material (sheet of paper), a cleaner 5 for removing residual toner from the photosensitive drum 1, and a discharge lamp 8 for discharging the surface of the photosensitive drum 1.

In the multi-color image forming operation, the photosensitive drum 1 is uniformly charged by the charger 2, and is exposed to image light corresponding to image signals for a particular color so that an electrostatic latent image is formed. The latent image is developed into a visualized image by the developing device containing the corresponding color. These steps are repeated for the image signals for the plural colors predetermined, in the predetermined order. By doing so, a superposed multi-color toner image is formed on the photosensitive drum 1. The multi-color toner image is simultaneously transferred onto the recording material by the transfer means 4. By passing the recording material through the fixing device, a permanent image is provided.

The color laser beam printer is characterized in that toner images of different colors are superposedly formed on a photosensitive drum 1 to provide a multi-color toner image. Therefore, the developing method is desired to be such that the toner image or images already formed on the photosensitive drum 1 are not destroyed when the subsequent latent image is developed and that a color toner is not introduced in different color developing devices. From this standpoint, a non-contact type developing method is desired. As for the image exposure light source, a semiconductor laser is typical. For example, as shown in the Figure, the semiconductor laser 6 is driven in accordance with a color separated image data from a reader 10, and the beam produced from the semiconductor laser 6 scans the photosensitive drum 1 so as to form an electrostatic latent image in accordance with an image signal for a particular color.

However, in the conventional apparatus, the latent image formation for the first color is proper because the photosensitive drum 1 is directly exposed to the image beam, but in the second and subsequent exposures, the photosensitive drum 1 has to be exposed to the image light through the already formed toner image. Therefore, the amount of exposures of the photosensitive drum 1 are different for the toner existing portion than for the toner absent portion, with the result that the proper latent image formation is not possible. Therefore, the color reproduction property is rather poor in this process.

Another problem with the color image formation process in this type is that when a character or line is developed on the toner image, there is a tendency that the character or the line is thinned.

Referring to FIG. 11, this will be described in detail. FIG. 11 shows the change of the image bearing member surface potential in the process of the multi-color image formation in such an apparatus. For the purpose of simple explanation, the polarity is selected as to be positive.

(1) The image bearing member is uniformly charged by the charger to a predetermined positive surface potential E (FIG. 11A).

(2) The image bearing member is exposed to a first image beam by an exposure source such as semiconductor laser or the like, by which the potential of the portion exposed to the first beam decreases to E' (FIG. 11B).

(3) The electrostatic latent image thus formed is developed with a developing device supplied with a positive bias voltage close to the surface potential E (non-exposed portion). As a result, a positively charged toner is deposited to the first exposed portion having a relatively low potential, so that a first toner image is formed (FIG. 11C).

(4) The photosensitive drum is discharged by a pre-exposure lamp (discharging lamp) or the like, by which the surface in the non-exposed portion is electrically discharged, so that the charge of the toner deposited portion becomes higher by a potential T1 resulting from the toner charge (FIG. 11D). The discharging step is carried out to prevent the over charging of the non-exposed portion.

(5) The image bearing member surface now having the first toner image is recharged uniformly again, so that substantially uniformly surface potential E is provided irrespective of the presence or absence of the toner. At this time, the recharging operation is carried out on the toner image, so that the charge amount of the toner increases, and the toner potential (the potential due to the toner charge) is increased (from T1 to T1'). Therefore, even if the surface potential E on the image bearing member is uniformly, the potential on the photoconductive layer surface (below the toner layer) is lower by the toner potential T1', that is, it is E−T1' (FIG. 11E).

If the surface of the image bearing member is exposed to the second image light in the same light quantity as the first image exposure, the image exposure is effected through the first toner image. Because the surface potential of the photoconductive layer is low (E−T1') and because the image exposure amount is reduced by the toner image, the surface potential of the image bearing member is E" in the exposed portion, with the result that it is higher than in the toner absent portion (FIG. 11F).

(7) Similarly to (3), the developing operation is carried out with a positively charged toner but having different color from the first toner, so that a superposed toner image is formed. However, even if the first toner image and the second toner image are superposed with the same image exposure amount (6), the latent image contrast in the second toner image is smaller with the result that the toner amount of the second toner image is smaller (FIG. 11G).

Thereafter, the charging operation is carried out (FIG. 11H), and the third and fourth toner images are overlaid, in which the above-described phenomenon is further remarkable.

SUMMARY OF THE INVENTION

Accordingly, it is a principal object of the present invention to provide an image forming apparatus capable of forming a proper color image when a superposed developing operation is performed.

It is another object of the present invention to provide a multi-color image forming apparatus which is substantially free of the above problems, which is proper in the color reproduction property, and which is capable of sharply reproducing fine image portions such as characters and lines.

According to an aspect of the present invention, there is provided a color electrophotographic apparatus, comprising: a photosensitive member movable along an endless path; charging means for charging said photosensitive member; scanning optical means for scanning said photosensitive member having been charged by said charging means with information light responsive to color signals; control means for controlling an exposure amount of said photosensitive member by said scanning optical means; transfer means for simultaneously transferring toner images formed superposedly on said photosensitive member; wherein said control means controls said optical scanning means in consideration of transmissivity of the light through the toner.

In this specification, one picture element means a minimum recording unit for record of image information. This applies to hi-level, multi-level and pseudo-tone-gradation recording.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4A & 4B schematically show correction process in the apparatus according to an embodiment of the present invention.

FIG. 8 shows a laser driver circuit.

FIG. 9 is a block diagram of a PWM circuit.

DETAILED DESCRIPTION OF PREFERRED EMBODIMENTS

Referring to the accompanying drawings, the embodiments of the present invention will be described.

EMBODIMENT 1

Figure 1:
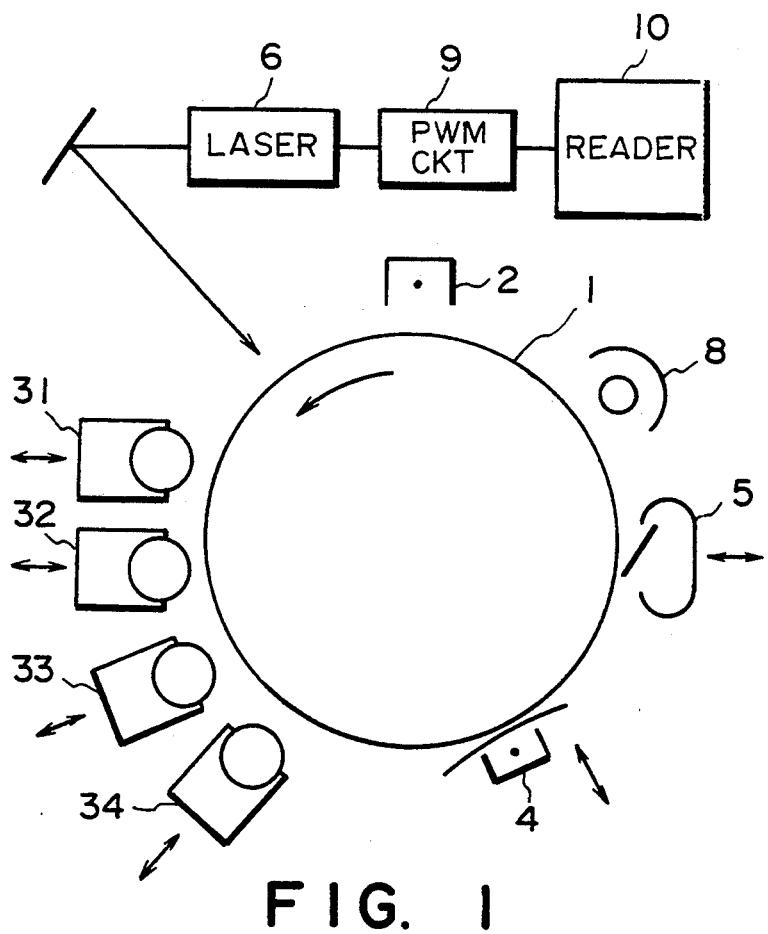
FIG. 1 illustrates a process of operation in an apparatus according to a first embodiment of the present invention.
Figure 5:
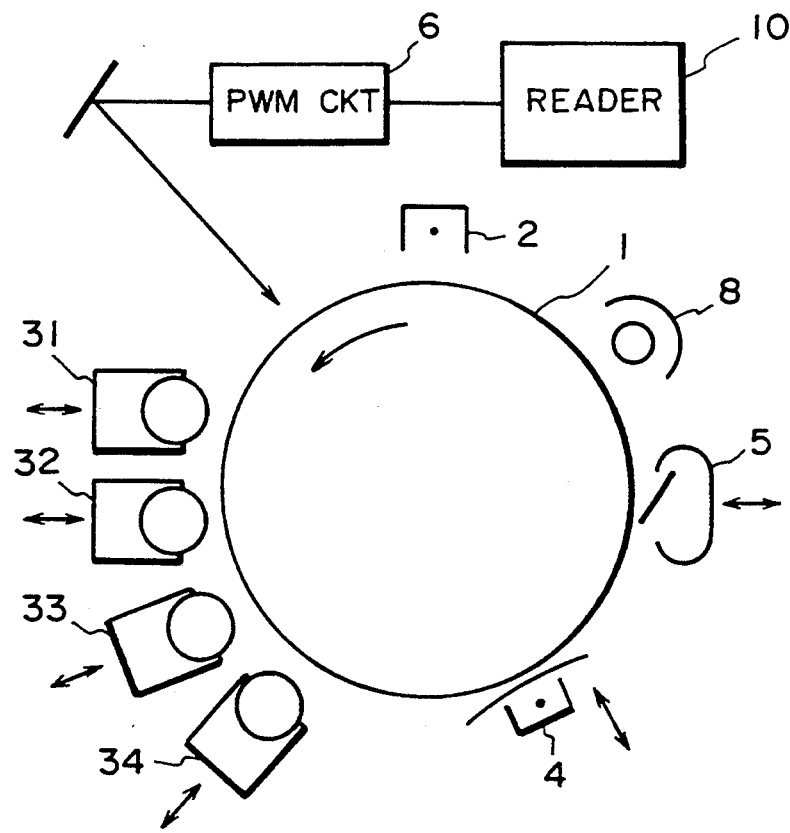
FIG. 5 illustrates a conventional superposing development process.

FIG. 1 shows a major part of a color laser beam printer of an electrophotographic type according to a first embodiment of the present invention. The color laser beam printer functions to produce hard copies in accordance with image data supplied from various image data output apparatus such as an image data forming apparatus, an image storing apparatus, an image reader, an image processing apparatus, an image display apparatus or the like. The same reference numerals as in FIG. 5 are assigned to the elements having the corresponding functions, and the detailed description thereof are omitted for simplicity. The present invention is applicable to various multi-color image forming machines such as color printers, color copying machines or the like and to various multi-color image forming machine such as color printer, color copying machines or the like of non-electrophotographic type.

The printer of this embodiment comprises a photosensitive drum 1 having a conductive base drum and a photoconductive layer thereon. The photosensitive drum 1 rotates in the direction indicated by an arrow. Along the rotational direction, there are provided a charger 2 for uniformly charging the photosensitive drum 1, four developing devices 31, 32, 33 and 34 (first, second, third and fourth developing devices) containing yellow toner, magenta toner, cyan toner and black toner, respectively, image transfer means 4 for transferring the toner image after development onto a recording material (a sheet of paper), a cleaner 5 for removing residual toner remaining on the photosensitive drum 1, and discharging lamp for electrically discharging the surface of the photosensitive drum 1. As for the exposure source, a semiconductor laser 6 is used.

The semiconductor laser 6 is driven in accordance with color separation image data supplied from a reader 10.

In this embodiment, color separation image data supplied from the reader 10 is supplied to a pulse width modulation (PWM) circuit 9, where the image exposure time period for one picture element is changed. In other words, the pulse width modulation circuit 9 is a correction means for the color separated image data. It corrects the color separation image data supplied from the reader 10 in accordance with the amount of toner for each of the colors on the basis of prediction from the data, so that the exposure time per unit picture element is changed in accordance with the toner amount. The semiconductor laser 6 is driven by the drive signal corrected by the pulse width modulation circuit 9. The light beam produced from the semiconductor laser 6 scans the photosensitive drum to form an electrostatic latent image in accordance with the image signal for a particular color.

The structure and the operation of the pulse width modulation circuit 9 for changing the exposure time per picture element will be described.

FIG. 9 shows an example of a pulse width mutation (PWM) circuit 9 used in this embodiment. FIGS. 8 and 9 show an example of a laser driver circuit, and FIG. 10 is a timing chart showing operation of the pulse width modulation circuit of FIG. 9.

In FIG. 9, an 8-bit digital signal which is a color separation image data from the reader 10, is supplied to a TTL latching circuit 401 is latched thereby. The latching circuit 401 is supplied with an image clock signal f through ½ frequency divider 408 from a clock signal oscillator 406 which produces clock signals 2f. In synchronism with the picture element clock signal f, a TTL logic level signal is supplied to a first level converter 402 from the latching circuit 401. The first level converter 402 converts the TTL logic level signal to a high speed ECL logic level signal, and supplies the signal to a digital-analog converter (D/A converter) 403 to convert the ECL logic level signal to an analog signal. The converted analog signal is supplied to one input of an ECL comparator 404. The comparator 404 produces a pulse width modulation (PWM) signal for the ECL logic level in cooperation with an ECL triangle wave signal d from a triangular wave generator 407 to the other input of the comparator 404. The PWM signal from the comparator 404 is converted to a TTL logic level PWM signal by a second level converter 405 and is supplied to a laser driver circuit 500. The triangular wave generator 407 is in synchronism with a clock signal 2f to produce an ideal triangular signal. The ½ frequency divider 408 functions to divide the clock signal 2f to product picture element clock signals f. Therefore, the clock signals 2f have a period which is twice as long as the period of the picture element clock signals f. In order to operate the circuit at high speed, the ECL logic circuits are used at various portions.

Figure 10:
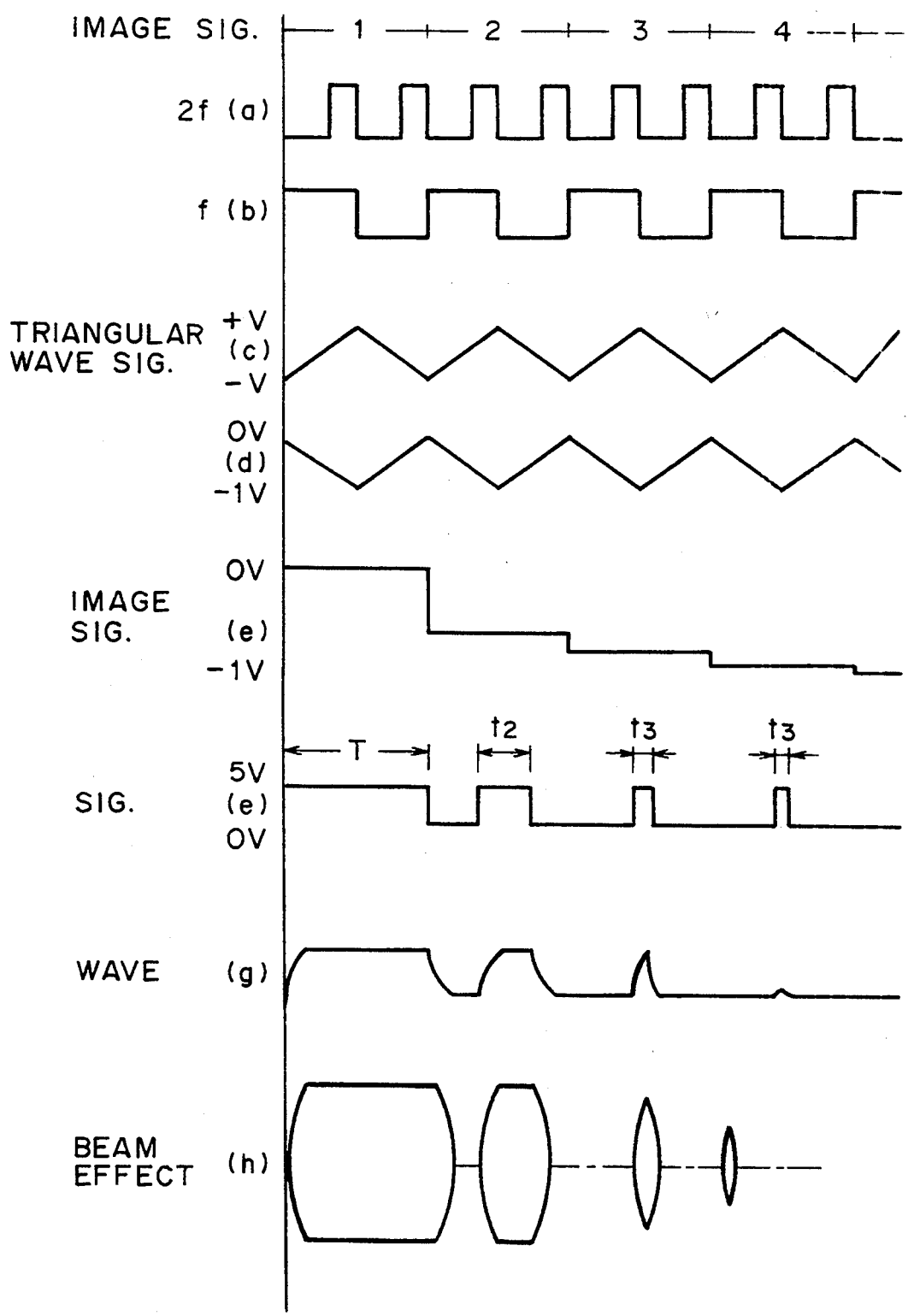
FIG. 10 is a timing chart illustrating operation of the PWM circuit.

Referring to FIG. 10 (timing chart), the operation of the pulse width modulating circuit 9 of the above structure will be described. The clock signals 2f and the picture element clock signals f having the twice period are associated in the manner shown in the Figure. The triangular wave generator 407 divides the clock signals 2f temporarily to ½ frequency, and then produces triangular wave signals c in order to maintain the duty ratio of 50% in the triangular wave generated. The triangular wave signals c are converted to ECL levels (0–1 V), and the ETC triangular wave signals d are produced.

On the other hand, the picture element signal e has 256 tone levels between white (00H) and black (FFH). The "H" represents hexadecimal digit. In FIG. 10, the image signal e is expressed as an ECL voltage level to which some image signals are D/A-converted. For example, the first picture element has a black level (FFH); the second picture element has an intermediate tone level (80H); the third picture element has another intermediate tone level (40H); and the fourth picture element has a further intermediate tone level (20H). The comparator 404 compares the ECL triangular wave signal d and the picture element signal e, and produces a PWM signal having pulse widths T, t2, t3, t4 or the like in accordance with the densities of the picture elements. The PWM signals are converted to TTL level signals (0 or 5 V), i.e., PWM signals f, which in turn are supplied to the laser driver circuit 500.

Referring to FIG. 8, the structure of the laser driver circuit 500 will be described. The laser driver circuit 500 is a constant current circuit and uses a semiconductor laser element 501 as a light emitting source. The semiconductor laser element 501 produces a laser beam when a switching transistor 502 is rendered on. When the switching transistor 502 is rendered off, the laser beam is stopped. The switching transistor 502 cooperates with a transistor 504 to establish a current switching circuit to on-off (transfer current)-controls the current flowing through the semiconductor laser element 501 in accordance with the supplied TTL PWM signal f. The current flowing through the laser element 501 is controlled to be constant by the transistor 505. The constant current level is changeable by changing the base potential of the transistor 505. More particularly, the supplied 8 bit laser power level is converted to an analog voltage by a digital-analog converter 503, and a voltage provided as a result of comparison with a reference voltage is supplied to the base of the transistor 505 to determine a laser driving current level corresponding to the laser power level.

By the PWM exposure using a pulse width modulating circuit 9, 256 tone levels can be provided in one picture element.

In this embodiment, the used toner is polyester resin toner having a particle size of 8 microns, and the image exposure source uses the semiconductor laser 6 producing a light beam having a wavelength of 780 nm.

Figure 6:
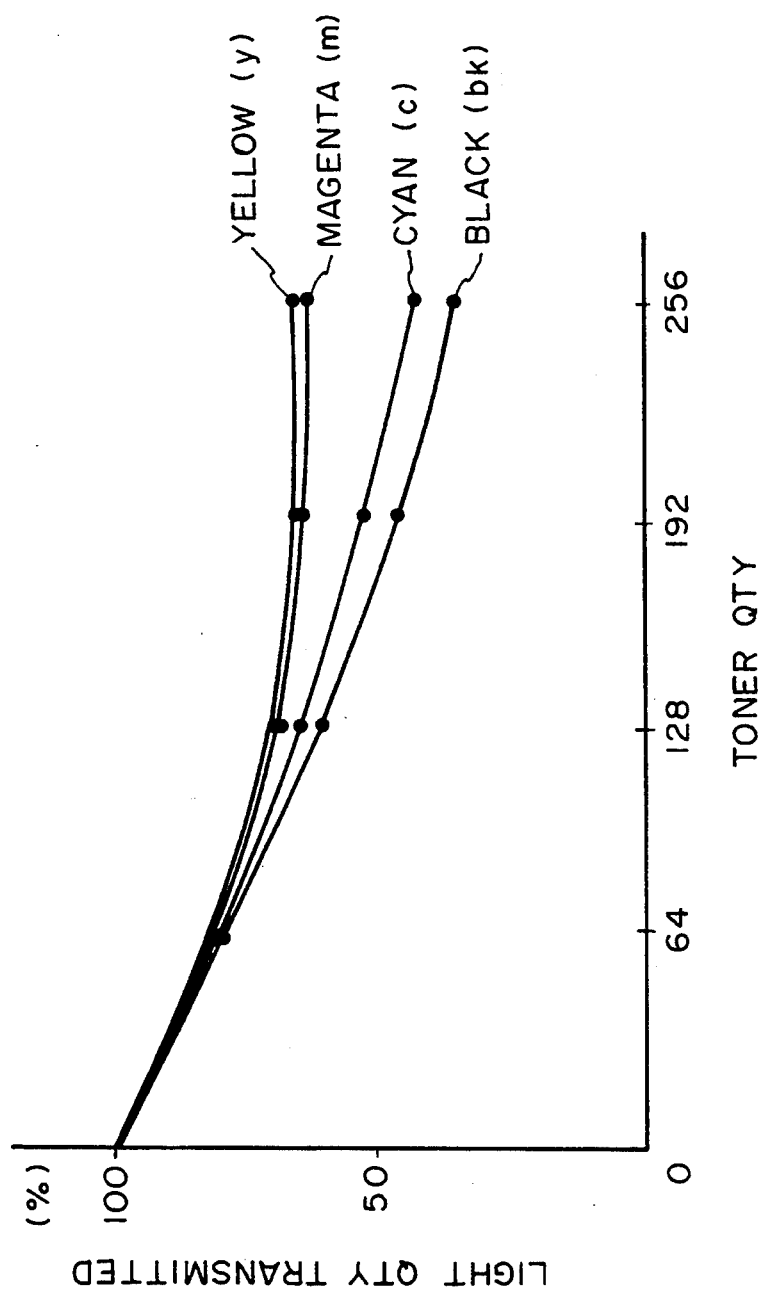
FIG. 6 shows a relation between a toner amount and a quantity of transmitted light.

FIG. 6 shows the laser transmissivity of the magenta toner, yellow toner, cyan toner and black toner having the particle size of 8 microns. In the determination of the transmissivities, the transmissivity is 100% when a laser spot beam is passed through a transparent film and measured by a sensor adjacent the photosensitive drum 1. The transmissivities are determined as the percentage when unfixed toner is placed on the transparent film.

The relation between the toner amount and the laser transmissivity for each color toner is expressed as follows:

Yellow:

$$Fy(Xy) = 4.9 \times 10^{-4} \times X^2 - 2.7 \times 10^{-1} \times X + 100 \qquad (1)$$

Magenta:
$$Fm(Xm) = 4.4 \times 10^{-4} \times X^2 - 2.7 \times 10^{-1} \times X + 100 \quad (2)$$

Cyan:
$$Fc(Xc) = 4.3 \times 10^{-4} \times X^2 - 3.4 \times 10^{-1} \times X + 100 \quad (3)$$

Black:
$$Fbk(Xbk) \times 5.9 \times 10^{-4} \times X^2 - 4.0 \times 10^{-1} \times X + 100 \quad (4)$$

Where X is the amount of the toner (the laser beam was PWM-controlled so as to provide maximum toner amount Xmax=255 (256 tone levels), and F(X) (%) is the laser transmissivity.

This embodiment uses these equations to compensate for the attenuation of the laser light quantity (amount of exposure) in the manner shown in FIG. 4B so that the same amounts of exposures are provided irrespective of the presence or absence of the toner. In this embodiment, the color toners are superposed in the order of yellow toner, magenta toner, cyan toner and black toner. However, the order is not limited to this. The developing method is of non-contact type so as to avoid disturbance of the toner image already formed.

Referring to FIG. 8, the description will be made as to the method of correcting the light quantity to compensate for the attenuation by changing the output of the semiconductor laser. The output thereof in the continuous oscillation is determined by the level of the current flowing through the laser element 501. The current flowing through the laser element 501 is controlled by the transistor 505, more particularly by changing the base potential of the transistor 505. More particularly, the 8 bit laser power level is converted to an analog voltage level by the digital-analog converter 503, and a voltage level provided by the comparison of the voltage with the reference voltage is supplied to the base of the transistor 503, thus controlling the laser driving current. In this embodiment, the current level through the laser element 501 is changed in accordance with correcting equation which will be described hereinafter to control the output of the semiconductor laser 6.

It is assumed that B (mW) is the laser output, A (0−255) is the laser power level. In the semiconductor laser 6 used in this embodiment, B=0.05×(A−160). It is assumed that A″ is the laser power after correction, and B″ (mW) is the laser output after the correction, B″=0.05×(A″−160), and B=[[F(X)]100]×B″. Therefore, the power correcting equation for the correction of the image exposure is A″=INT[[100/[F(X)]]·×(A−160)+160]. Here, the correction part is [100/[F(X)]]=G(X). Here, "INT[]" means the minimum integer among the numericals in []. The reason for using the integer is that the laser power levels are integer levels. In this embodiment, the laser power levels are corrected in the following manner:

First color (yellow):
$$A''m = A$$

Second color (magenta):
$$A''y = INT[Gy(Xy) \times (A-160) + 160]$$

Third color (cyan):
$$A''c = INT[Gy(Xy) \times Gm(Xm) \times (A-160) + 160]$$

Fourth color (Black):
$$A''bk = INT[Gy(Xy) \times Gm(Xm) \times Gc(Xc) \times (A-160) + 160]$$

The PWM signal level P which is a signal (0–255) read from the scanner for the laser PWM exposure in the 256 tone levels is the same as the toner amount X if the correction is correct, and therefore, the above correcting equations are expressed as follows:

First color (yellow):
$$A''y = A$$

Second color (magenta):
$$A''m = INT[Gy(Py) \times (A-160) + 160]$$

Third color (cyan):
$$A''c = INT[Gy(Py) \times Gm(Pm) \times (A-160) + 160]$$

Fourth color (Black):
$$A''bk = INT[Gy(Py) \times Gm(Pm) \times Gc(Pc) \times (A-160) + 160]$$

In this embodiment, the laser power level before correction is set 180 (approximately 1 mW of the exposure strength), and therefore, the correction equations are as follows:

For first color latent image (yellow):
$$A''y = 180$$

For second color latent image (magenta):
$$A''m = INT[Gy(Py) \times 20 + 160]$$

For third color latent image (cyan):
$$A''c = INT[Gy(Py) \times Gm(Pm) \times 20 + 160]$$

For fourth color latent image (black):
$$A''bk = INT[Gy(Py) \times Gm(Pm) \times Gc(Pc) \times 20 + 160]$$

Figure 3:
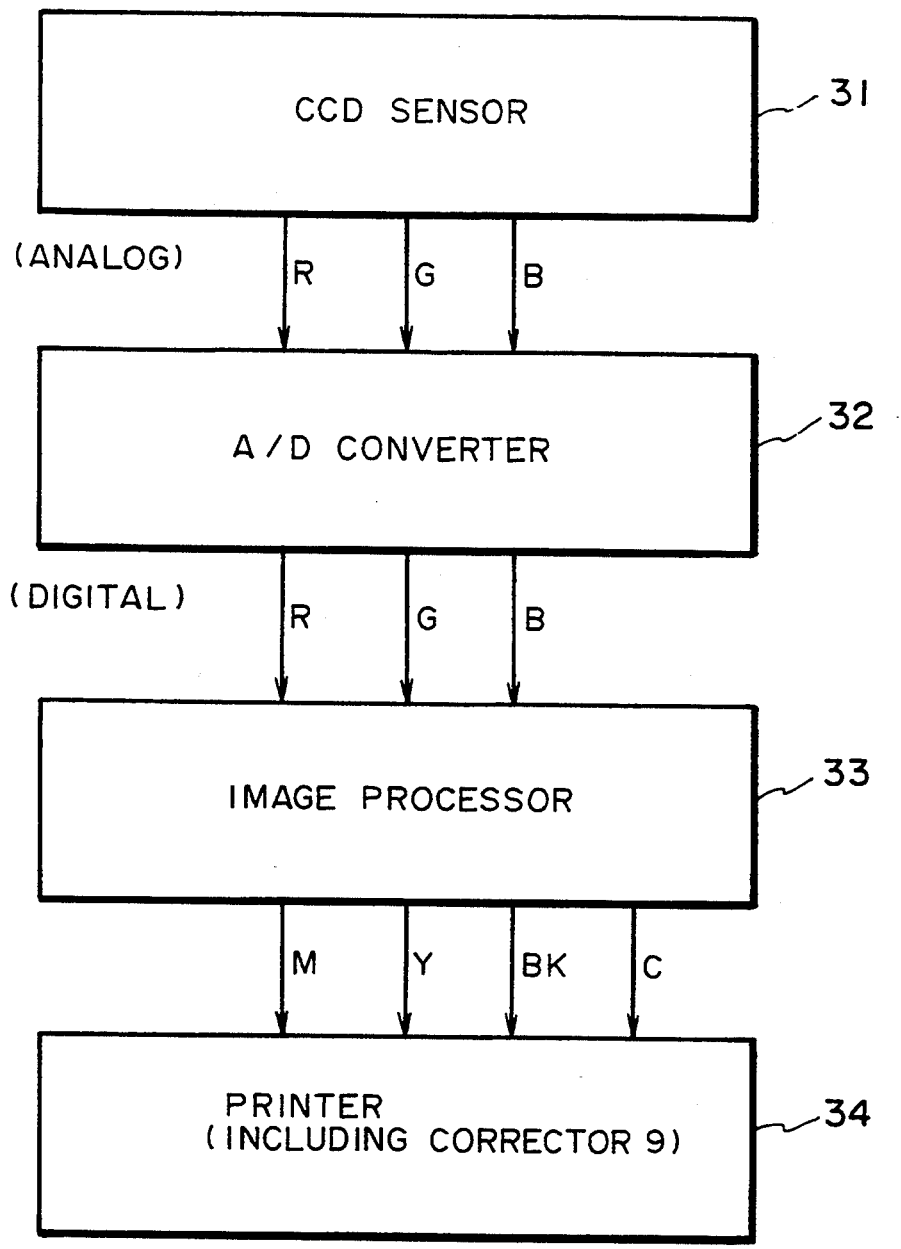
FIG. 3 is a block diagram of an image processor.

The description will be made as to the correction method using the correcting equations. As shown in FIG. 3, the signals for the red, green and blue components read by a CCD sensor 31 from an original image are converted to R, G and B digital signals by the A/D converter 32. The digial signals for the R, G and B components are subjected in the image processor 33 to log conversion, masking, UCR or the like processing, and then, the data of the picture elements are produced in the order from the magenta component. Similarly, yellow component, cyan component and black component data are produced in this order.

The picture element data thus provided are subjected to the correcting operation in the printer 34 in the following manner. The processing and correction operation when the yellow component, magenta component, black component and cyan component signals are inputted.

When the yellow component signal Py is inputted, the latent image is formed on the photosensitive drum 1 with the laser power A. Simultaneously, a correcting term Gy(Py) for the next color (magenta), is supplied to the image memory.

When the magenta component signal Pm is supplied, the latent image is formed with the correction for the respective picture elements using the correction term Gy(Py) read out of the image memory, that is, with the laser power level of $A''m = INT[Gy(Py) \times 20 + 160]$. Simultaneously, a correcting term which is multiplied by Gm(Pm), that is, the correcting term $Gy(Py) \times Gm(Pm)$ is stored in the image memory.

When the cyan component signal Pc is supplied, the latent image is formed with the correction for the respective picture elements, that is, with the laser power level of $A''c = INT[Gy(Py) \times Gm(Pm) \times 20 + 160]$. Simultaneously, the correction term for the black component $Gy(Py) \times Gm(Pm) \times Gc(Pc)$ is stored in the image memory for each of the picture elements.

When the black component signal Pbk is finally supplied, the latent image is formed with the correction using the correcting term $Gy(Py) \times Gm(Pm) \times Gc(Pc)$, that is, with the laser power level of $A''bk = INT[Gy(Py) \times Gm(Pm) \times Gc(Pc) \times 20 + 160]$ for the respective picture elements,

EMBODIMENT 2

Figure 2:
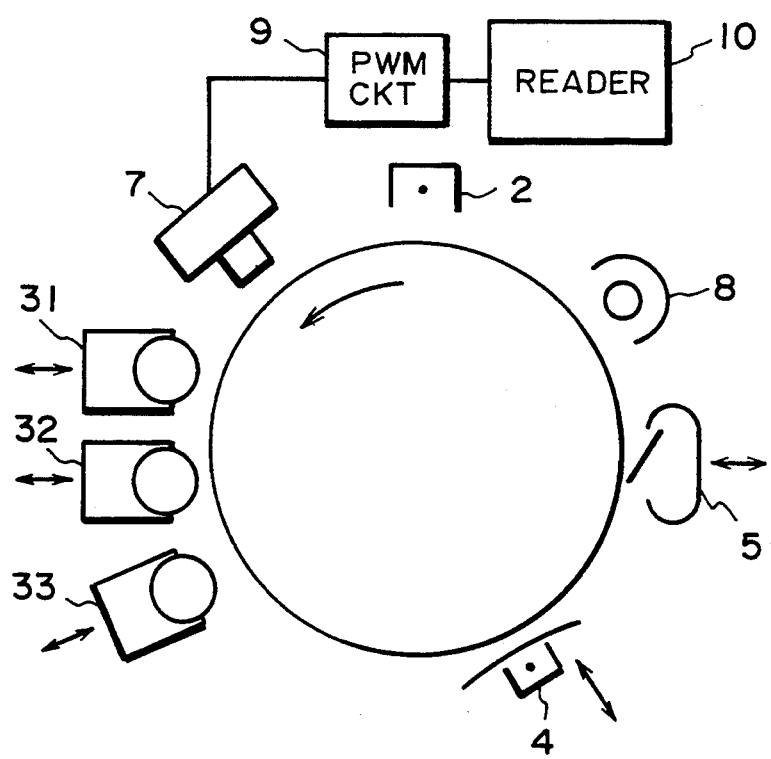
FIG. 2 illustrates a process operation in an apparatus according to a second embodiment of the present invention.

The correction method in this embodiment is similar to the method in the first embodiment. However, the exposure means is in the form of an LED array 7. FIG. 2 illustrates the process using the LED array 7. The toner used in this embodiment is, similarly to te first embodiment, a polyester resin having a particle size of 8 microns. The image exposure source includes an LED array 7 having a wavelength of 665 run, and the developing method is a non-contact type developing method.

In this embodiment, yellow, magenta and cyan toner images are superposed on the photosensitive drum 1 in this order to produce a color image in a superposing developing method. The order of the yellow, magenta and cyan are determined in consideration of the fact that the toner transmissivity of the wavelength of the LED array 7 is substantially the same as the transmissivity in the semiconductor laser 6 in the case of yellow toner and the magenta toner, but the light from the LED array 7 hardly transmits through the cyan toner.

In this embodiment, 17 tone levels are produced through dither method for 4×4 picture elements using the image exposure means in the form of a LED array. Therefore, considering one picture element, it is provided by two levels. Therefore, the method of correction in this embodiment is for the two levels for each of the picture elements, that is, the toner present portion and the toner absent portion.

It is assumed that B (mW) is the exposure light output, A (mA) is the current level for the LED light emission, $B = 1.2 \times 10^{-3} \times A$ in the LED array 7 in this embodiment. An input signal Q from the scanner for each of the picture elements is 1 for the picture element to be exposed, and is 0 for the picture element not to be exposed to light. The transmissivities (%) for the toners are Hm, Hy and Hc (constant) for the respective colors. The following corrections are made in order to make the exposure amounts of the photosensitive drum through the toner, irrespective of presence or absence of the toner. Assuming that the exposure output after the correction is B'', and the current level for the LED emission after the correction is A'', the corrections are $B'' = (100/H) \times B$, Q=0 (with toner) and $B'' = B$ for Q=0 (without toner). Therefore, the generic correction equation is $B'' = ]1 - (1 - 100/H) \times Q] \times B$. From this correction equation, the correction equation for the current level for the LED light emission is $A'' = [1 - (1 - 100/H) \times Q] \times A$.

For the first color (yellow):

$$A''y - A$$

For the second color (magenta):

$$A''m = [1 - (1 - 100/Hy) \times Qy] \times A$$

For the third color (cyan):

$$S''C = [1 - (1 - 100/Hy) \times Qy] \times [1 - (1 - 100/H) \times Qm] \times A$$

The correcting method using the correcting equation will be described. As shown in FIG. 3, the R, G and B component signals read by a CCD sensor from the image are converted to digital signals by the A/D converter. Yellow component is read out from each of the picture elements from the digital signals of the R, G and B components through a known image processing process. Similarly, the magenta and cyan components are read out in this order.

The description will be made as to the processing and the correction method when the yellow component, magenta component and cyan component signals are supplied.

When the yellow component signal Qy (1 or 0) is supplied, a latent image is formed on the photosensitive drum 1 with the current level A for the LED emission. Simultaneously, a correcting term for the next color (magenta), that is, $[1 - (1 - 100/Hy) \times Qy]$ is stored in the image memory for each of the picture elements. When the magenta component signal Qm (1 or 0) is supplied, a latent image is formed with the correction using the correcting term read out of the image memory $[1 - (1 - 100/Hy) \times Qy]$, that is, with the current level for the LED light emission $A''m = [1 - (1 - 100/Hy) \times Qy] \times A$ for each of the picture elements. Simultaneously, the correcting term for the cyan color multiplied by $[1 - (1 - 100/Hm) \times Qm]$, that is, the correcting term $[1 - (1 - 100/Hy) \times Qy] \times [1 - (1 - 100/Hm) \times Qm]$ for each of the picture elements.

When the cyan component signal Qc (1 or 0) is supplied finally, a latent image is formed with correction using the correcting term read out of the image memory $[1 - (1 - 100/Hy) \times Qy] \times [1 - (1 - 100/Hm) \times Qm]$, that is, with the current level for the LED emission of $A''c = [1 - (1 - 100/Hy) \times Qy] \times [1 - (1 - 100/Hm) \times Qm] \times A$ for each of the picture elements.

EMBODIMENT 3

In the second embodiment, three colors, i.e., yellow, magenta and cyan are overlaid because in the case of the LED array producing the wavelength of 665 nm, the cyan and black toners hardly transmit the exposure light. In order to accomplish the superposed development using four colors, the wavelength of the LED array light is made not less than 780 nm, similarly to the semiconductor laser. In this embodiment, the LED array providing the wavelength of 780 run is used, and the similar corrections as in the second embodiment is made. Then, four color superposing development is accomplished using the LED array.

The various values in this embodiment are determined on the basis of the toner, photosensitive member and the exposure means or the like, and therefore, if the nature of these elements are different, the values are different, correspondingly.

As described, in these embodiments, the attenuation or reduction of the exposure amount due to the presence of the developer such as toner on the photosensitive member is compensated by the current level supplied to the exposure means (semiconductor laser 6 or the LED array 7) to enhance the light output correspondingly. Therefore, as shown in FIG. 4, the quantity of light reaching the photosensitive member is made uniform irrespective of the presence or absence of the developer, thus permitting formation of proper latent image. Therefore, as compared with the conventional superposing process, the color reproducibility is remarkably improved, and a very high quality images can be provided.

EMBODIMENT 4

The process in this embodiment is similar to that shown in FIG. 1 in the first embodiment.

In this embodiment, the attenuation or reduction of the amount of exposure is corrected using equations (1)–(4) so as to make the quantity of light reaching the photosensitive drum 1 uniform irrespective of the presence or absence of the toner.

In this embodiment, the yellow, magenta, cyan and black colors are superposed in this order. As for the developing method, a non-contact one is used so as to prevent the previously formed toner image from being scraped off. In the correcting method in this embodiment to compensate for the attenuation of the laser beam due to the existence of the toner includes increasing the PWM exposure period by the amount corresponding to the attenuation of the laser exposure so as to make the exposure amount uniform irrespective of the presence or absence of the toner. Here, the exposure amount is laser output multiplied by the PWM exposure time or period. Assuming that a PWM input signal (256 levels (0−225) signals read by the scanner for the laser PWM exposure) is P, and the PWM output signal (the signal after the correction) is R, the actual correction equation using the laser transmitting light quantity F(X) (%) for the toner image on the photosensitive drum, is expressed $R=[100/[F(X)]] \times P$. Here, the correcting term is $[100/[F(X)]]=G(X)$.

EMBODIMENT 4

In the correcting method in Embodiment 3, that is, $R=G(X) \times P$, the PWM exposure time can not be corrected in the neighborhood of P=255 (the maximum PWM exposure time), because the maximum of the PWM level is 255. This embodiment is accomplished in consideration of this.

In this embodiment, the continuous oscillation power is set slightly high, that is, 3 mW. The development parameters are selected for 40% of the PWM exposure time under the normal condition. By this selection, the correction is made possible to not less than 40% of the laser transmission amount.

Here, the correction in this embodiment is made possible to not less than 40% transmission light quantity because when a latent image providing maximum monochromatic toner quantity with the apparatus and toner used in this embodiment, the quantity of transmitted light when the maximum amount of the toner is deposited on the photosensitive drum 1 is not less than 40%. The correcting equations in this embodiment are as follows:

First color (yellow)
(continuous oscillation output: 3 mW):

$$Ry=INT[0.4 \times Py)$$

Second color (magenta)
(continuous oscillation output: 3 mW):

$$Rm=INT[0.4 \times Gy(Xy) \times Pm]$$

Third color (cyan)
(continuous oscillation output: 3 mW):

$$Rc=INT[0.4 \times Gy(Xy) \times Gm(Xm) \times Pc]$$

Fourth color (black)
(continuous oscillation output: 3 mW):

$$Rbk=INT[0.4 \times Gy(Xy) \times Gm(Xm) \times Gc(Xc) \times Pbk$$

Here, "INT" means the minimum integer among the numericals in the parentheses. The reason for using the integer is that the signal levels of the PWM exposure are integers. When the corrections are made correctly, P and X are the same, and therefore, the above correcting equations can be expressed as follows:

First color (yellow)
(continuous oscillation output: 3 mW):

$$Ry=INT[0.4 \times Py)$$

Second color (magenta)
(continuous oscillation output: 3 mW):

$$Rm=INT[0.4 \times Gy(Py) \times Pm]$$

Third color (cyan)
(continuous oscillation output: 3 mW):

$$Rc=INT[0.4 \times Gy(Py) \times Gm(Pm) \times Pc]$$

Fourth color (black)
(continuous oscillation output: 3 mW):

$$Rbk=INT[0.4 \times Gy(Py) \times Gm(Pm) \times Gc(Pc) \times Pbk$$

The actual correcting method using the above correcting equations will be described. As shown in FIG. 2, R, G and B component signals provided by the CCD sensor 31 from the image are converted to digital signals by the A/D converter 32. From the R, G and B component digital signals, the image processor 33 reads the yellow component signal for each of the picture element. Similarly, the magenta, cyan and black components are read.

The description will be made as to the processing in the printer 34 when the yellow, magenta, cyan and black component signals are supplied.

When the yellow component signal Py is supplied, an output signal $Ry=0.4 \times Py$ is supplied, and a latent image is formed on the photosensitive drum 1 by the semiconductor laser. Simultaneously, a correcting term Gy(Py) for the next color (magenta) is stored in the image memory for each of the picture elements. When the magenta component signal Pm is supplied, the correction is made using the correcting term Gy(Py) read out of the image memory, a latent image is formed on the photosensitive drum 1 by the semiconductor laser operated with the signal Rm=INT[0.4×Gy(Py)Pm]. Simultaneously, the correcting term for the cyan color which is multiplied by Gm(Pm), that is, Gy(-Py)×Gm(Pm) is stored in the image memory by rewriting.

When the cyan component signal Pc is supplied, the signal is corrected using the correcting term Gy(-Py)×Gm(Pm) read out of the image memory, and a signal Rc=INT[0.4×Gy(Py)×Gm(Pm)×Pc] is outputted, so that the latent image is formed on the photosensitive drum by the semiconductor laser. Simultaneously, the correcting term in the image memory is rewritten by multiplying by Gc(Pc), that is, the correcting term for the black color is Gy(-Py)×Gm(Pm)×Gc(Pc) for each of the picture elements.

Finally when the black component signal Pbk is supplied, the correction is made using the correcting term read out of the image memory, that is, Gy(-Py)×Gm(Pm)×Gc(Pc), and a signal Rbk=INT[0.4-×Gy(Py)×Gm(Pm)×Gc(Pc)×Pbk], and the latent image is formed on the photosensitive drum by the semiconductor laser.

EMBODIMENT 5

In this embodiment, the output of the semiconductor laser 6 in the continuous oscillation is changed to 1 mW, 2 mW, 3 mW and 3 mW for first, second, third and fourth colors, respectively with the following corrections:

Output in continuous oscillation for the first color (yellow): 1 mW $Ry=Py$

Output in continuous oscillation for the second color (magenta): 1 mW $Rm=INT[(\frac{1}{2})\times Gy(Py)\times Pm]$ Output in continuous oscillation for the third color (cyan): 1 mW $Rc=INT[(\frac{1}{3})\times Gy(Py)\times Gm(Pm)\times Pc]$ Output in continuous oscillation for the fourth color (black): 1 mW $Rbk=INT[(\frac{1}{3})\times Gy(Py)\times Gm(Pm)\times Gc(Pc)\times Pbk]$ In this method, the laser output is made stronger with the proceeding of the color superposition, so that the exposure time is made shorter (the PMW exposure time is made shorter), by which the range in which the PWM exposure amount correction is possible is expanded without changing the exposure amount (laser output×PWM exposure time).

The actual correcting method using the correction equation will be described. As shown in FIG. 2, the R, G and B component signals read by the CCD sensor 31 from the image are converted to digital signals by the A/D converter 32. The image processor 33 reads the yellow component signal from the digital signal for each of the picture elements. Similarly, the magenta, cyan and black component signals are read in this order. The processing and correction method by the printer 34 when the yellow, magenta, black and cyan component signals are supplied, will be described. When the yellow component signal Py is supplied, and output signal Ry=Py is produced, and a latent image is formed on the photosensitive drum 1 by the semiconductor laser. Simultaneously, the correcting term Gy(Ay) for the next color (magenta color) is stored in the image memory for each of the picture elements.

When the magenta component signal Pm is supplied, the correction is made using the correcting term Gy(Py) read out of the image memory, and a latent image is formed on the photosensitive drum 1 by the semiconductor laser actuated by a signal Ry=INT[(½)-×Gy(Py)×Pm]. And simultaneously, a correcting term for the cyan which is multiplied by Gm(Pm), that is, Gy(Py)×Gm(Pm) is stored in the image memory for each of the picture element by rewriting.

When the cyan component signal Ac is supplied, the correction is made using the correcting term Gy(-Py)×Gm(Pm) read out of the image memory, and a latent image is formed on the photosensitive drum 1 by the semiconductor laser actuated by a corrected signal, that is, Rc=INT[(⅓)×Gy(Py)×Gm(Pm)×Pc]. Simultaneously, the correcting term in the image memory is rewritten by multiplying Gc(Pc) to the correcting term for the black color, that is, Gy(Py)×Gm(Pm)×Gc(Pc) for each of the picture elements.

Finally, when the black component signal Pbk is supplied, the correction is made using the correcting term read out of the image memory, that is Gy(-Py)×Gm(Pm)×Gc(Pc), and a latent image is formed on the photosensitive drum 1 by the semiconductor laser actuated by a signal Rbk=INT[(1/3)×Gy(Pm)-×Gy(Py)×Gc(Pc)×Pbk].

EMBODIMENT 6

In this embodiment, the use is made with an LED providing light having a wavelength of 665 nm, as the exposure means. The superposing development is for three colors, i.e., yellow, magenta and cyan colors.

In this embodiment, the light emitting time of the LED is controlled to control the PWM exposure. As for the correcting method, the continuous light emitting output power is selected relatively high as in the first embodiment, and the PWM exposure period is approximately 40% of the normal level, and the developing condition is set. With this conditions, the PWM correction is made.

EMBODIMENT 7

The same LED element as in Embodiment 6 is used with the PWM exposure. As for the correcting method, similarly to Embodiment 5, the continuous light emission power is made stronger sequentially for the colors, and the light emitting time is made shorter, so that the correctable range is expanded. Then, the PWM correction is made.

EMBODIMENT 8

In Embodiments 6 and 7, three colors, i.e., yellow, magenta and cyan colors are superposed, because the cyan and black toner hardly transmit the 665 nm beam of the LED array. In order to superpose four colors, the wavelength of the light emitted by the LED array is made not less than 780 run, as in the case of the semiconductor laser. In view of this, the present embodiment uses the LED array producing light having the wavelength of 780 Dan. The same corrections as in the Embodiments 6 and 7 are made. By doing so, four color color superposing development is made possible using the LED array.

The values in this embodiment are determined on the basis of the used toner, the photosensitive member, the exposure means and the like, and therefore, if the natures of these elements are different, the values are different correspondingly.

As described in the foregoing, the attenuation or reduction of the exposure amount due to the existence of the developer such as toner is compensated for by the PWM exposure time, more particularly, by increasing the exposure time, by which as shown in FIG. 7, the exposure amount of the photosensitive member is the same irrespective of the presence or absence of the toner. Therefore, the proper latent image formation is made possible, and the color reproducibility is remarkably enhanced, as compared with the conventional superposing development process.

Figure 4A:
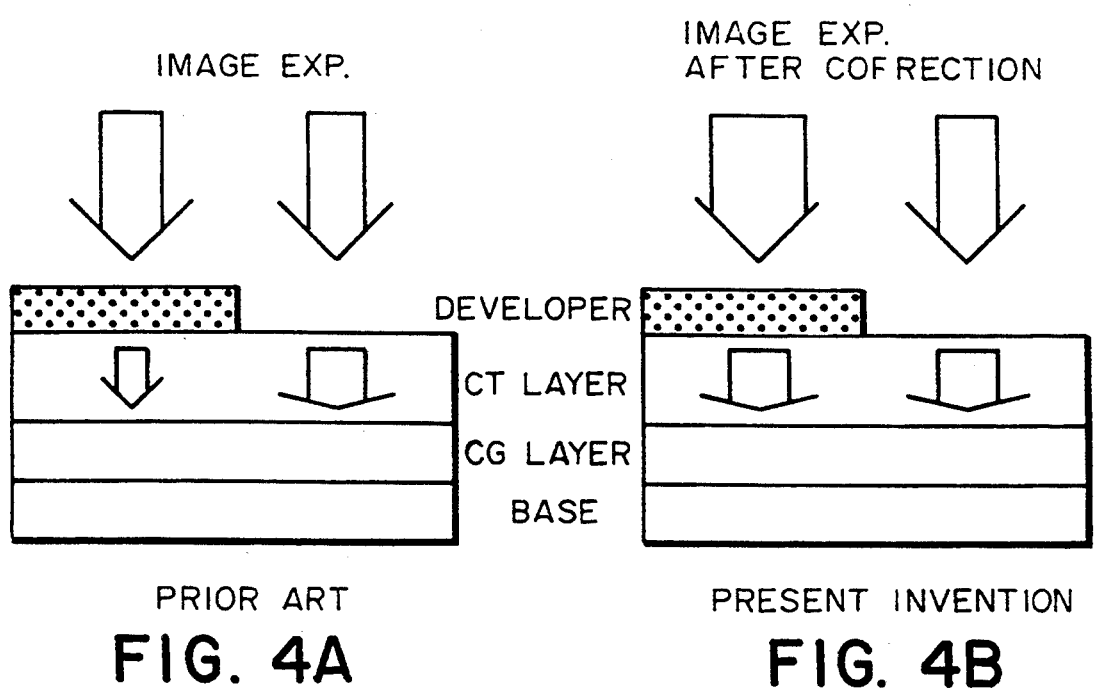

According to the first-eighth embodiments, photosensitive member is exposed to the image through the developer such as toner, as shown in FIG. 4A. Then, the exposure amount is reduced by the presence of the developer. However, as shown in FIG. 4B, the image exposure light (current level) is corrected, so that the amount of the light reaching the photosensitive drum 1 is made uniform irrespective of the presence or absence of the developer. Therefore, the color reproduction property is improved in the color image forming apparatus using the superposing developing process.

Figure 7A:
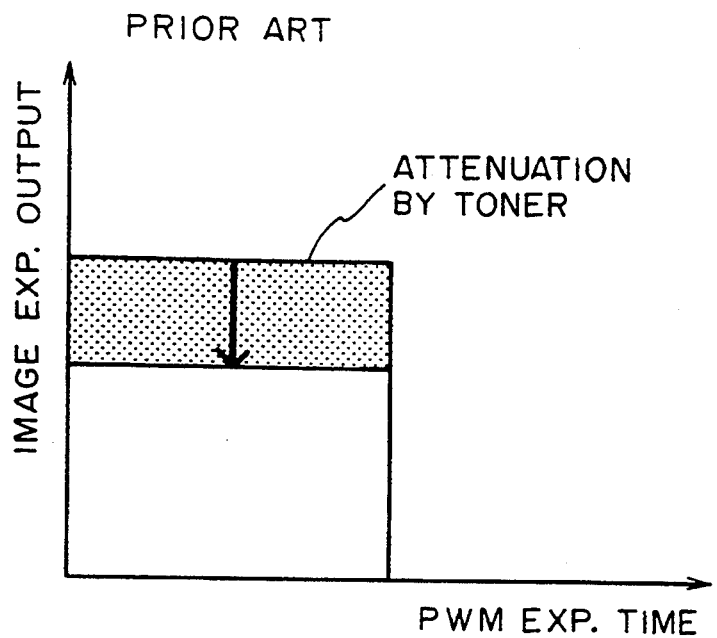
FIG. 7A & 7B schematically show a correction process in an apparatus according to an embodiment of the present invention.
Figure 7B:
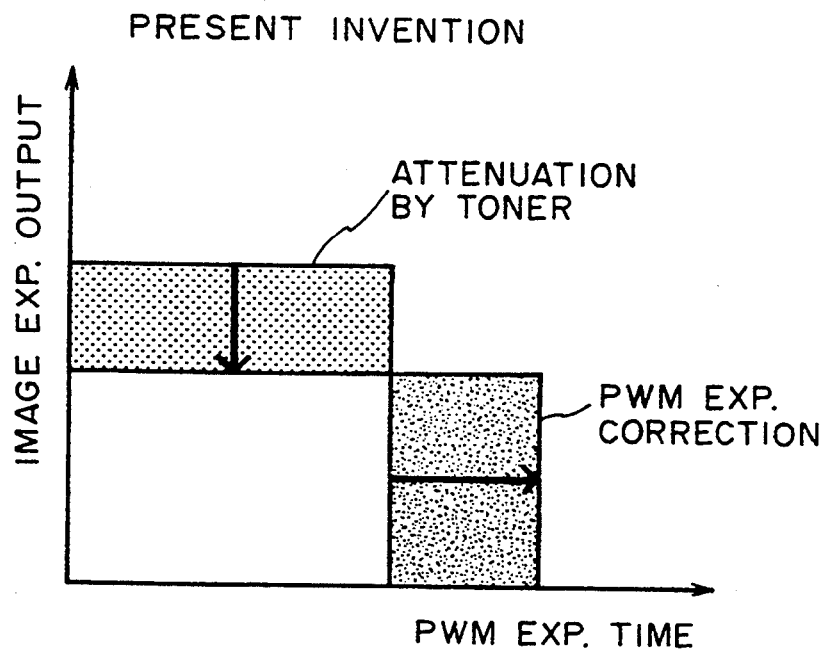

FIG. 7A, the PWM exposure time or period is made longer to compensate for the reduction or attenuation of the light quantity by the existence of the toner on the photosensitive member as in FIG. 7B, so that the exposure amount of the photosensitive drum 1 is made uniform irrespective of the presence or absence of the toner on the photosensitive member. Therefore, the color reproduction property is improved in a color image forming apparatus using superposing developing process.

EMBODIMENT 9

Figure 11:
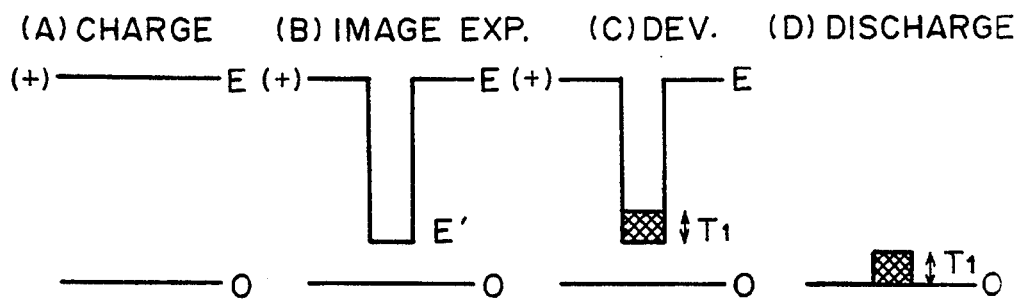
FIG. 11 shows the change of the surface potential on the image bearing member in a conventional multi-color image forming apparatus.
Figure 11:
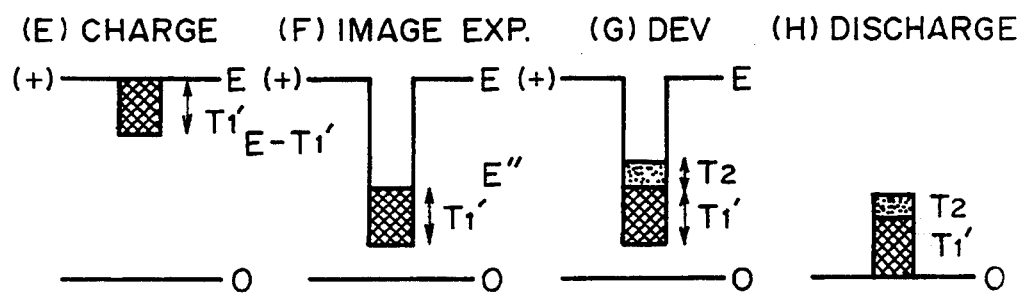

This embodiment provides a solution not only to the problem resulting from the light transmissivity through the toner is different if the wavelength of the light is different but also to a problem of the toner charge potential described in conjunction with FIG. 11.

The apparatus used in this embodiment is the same as that shown in FIG. 1. The toner used in this embodiment is a polyester toner having a particle size of 8 microns, similarly to the first embodiment. The image exposure light source is a semiconductor laser 6 producing a laser beam having a wavelength of 780 run. FIG. 5 shows a relation between the quantity of the toner having the particle size of 8 microns (yellow, magenta, cyan and black) and the laser transmissivity. The quantity of the toner corresponds to the PWM signal level (0 (00H)−255 (FFH)). As for the measuring method, an image bearing member having a transparent conductive base is used, and a light quantity measuring device (detector) is fixed in the image bearing member in the form of a drum, to which the laser beam from the semiconductor laser is projected. The transmissivities are measured with various toners on the image bearing member, and the measurement is expressed with the exposure amount of the image bearing member without toner being 100%.

Figure 12:
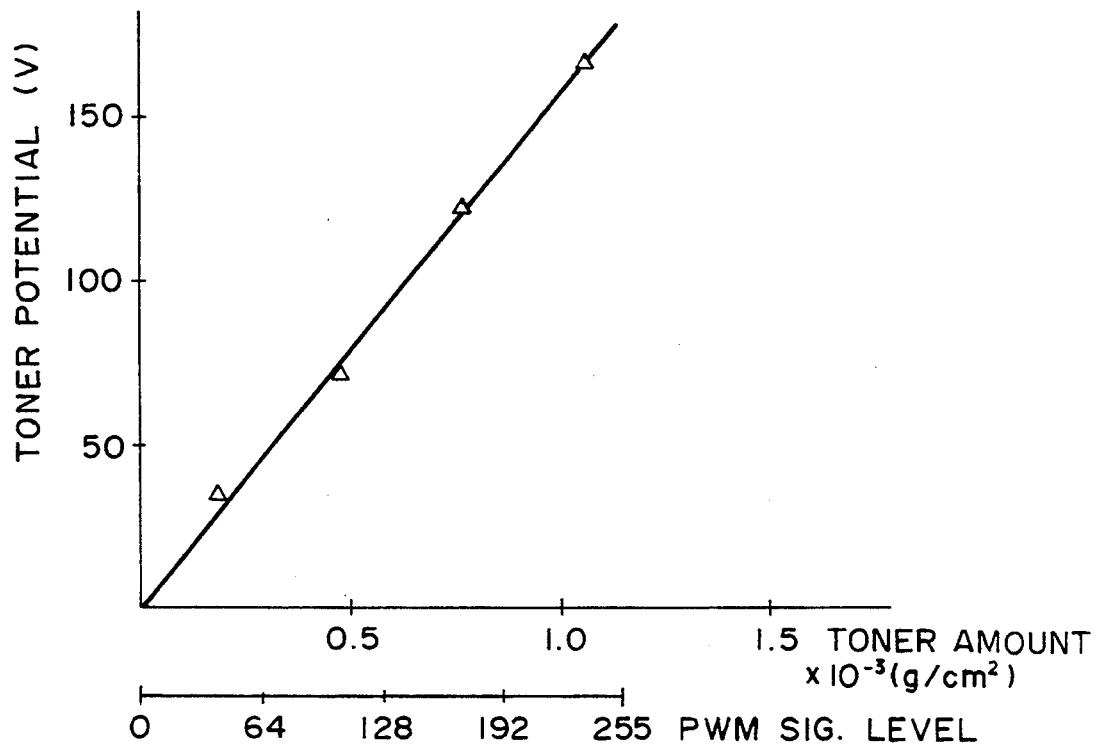
FIG. 12 shows a relation between the toner amount and the potential of the toner.

FIG. 12 shows a relation between the quantity of the toner and the potential resulting from the electric charge of the toner, which is the surface potential on the grounded image bearing member, that is, the grounded photosensitive drum after the re-charging and the pre-exposure thereof, and which will hereinafter be called "toner potential".

Figure 13:
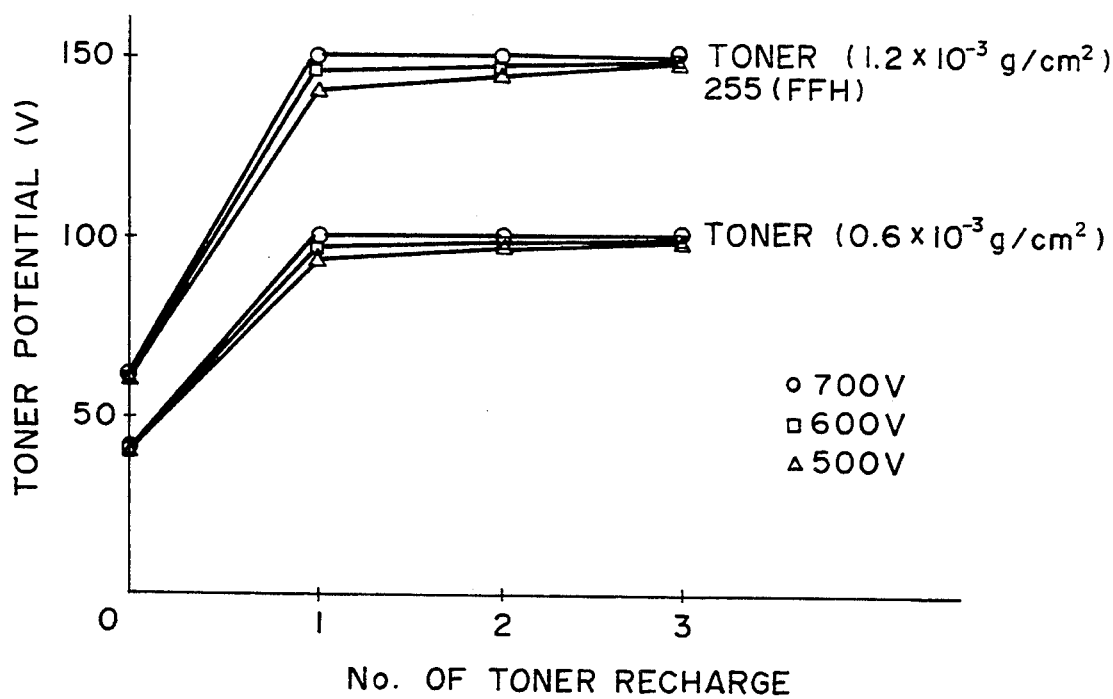
FIG. 13 shows a relation between a number of charting for the toner and the toner potential.

FIG. 13 shows a relation between the number of charging operations for the toner and the toner potential. As shown in FIG. 13, when the used toner is a polyester toner, the toner potential saturated by one re-charging with the grid bias of 500 V–700 V for the primary charger. Therefore, in the correction in this embodiment, it is assumed that the toner potential is determined definitely by the quantity or amount of the toner, as shown in FIG. 12. In this embodiment, it has been confirmed that there is no difference in the toner potential depending on the colors of the toner.

In order to investigate the influence of the toner potential, the influence of the light blocking by the toner has to be removed. For this purpose, an image bearing member having a transparent conductive base is used. The experiments have been carried out using backside exposure method in which the image bearing member is exposed to image light by an LED array from the inside of the image bearing drum.

Figure 16:
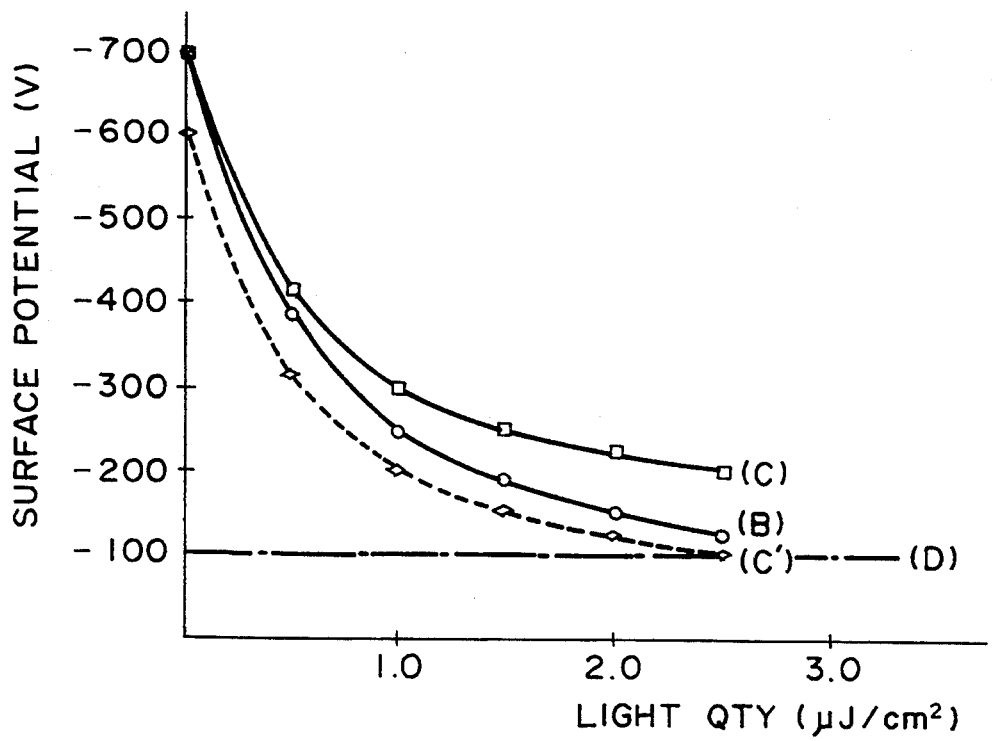
FIG. 16 shows the attenuation of the potential on the image bearing member when the image is exposed from the inside of the image bearing member.

In FIG. 16, a curve (C) shows the surface potential attenuation curve (charge potential of 700 V) when the amount of the toner corresponding to the toner potential 100 V (chain line D) is deposited on the image bearing member. Curve (B) is a surface potential attenuation curve (charge potential of 700 V) without the toner. The difference between the curves C and B is the influence by the toner potential.

As regards the causes of the difference, the following is considered. In the case of the image bearing member having the toner thereon, even if the surface potential is similarly 700 V which is the same as without the toner, the potential is lower by the toner potential on the photoconductive layer surface, that is, 600 V. Therefore, the surface potential attenuation curve (charge potential of 700 V) with the toner on the image bearing member is the surface potential attenuation curve (charge potential of 600 V) of the image bearing member plus the toner potential of 100 V (D), as shown by the curve (C). Therefore, even if there is no light blocking effect by the toner, the surface potential attenuation curves with the toner and without the toner are different as long as the toner charge exists.

Figure 17:
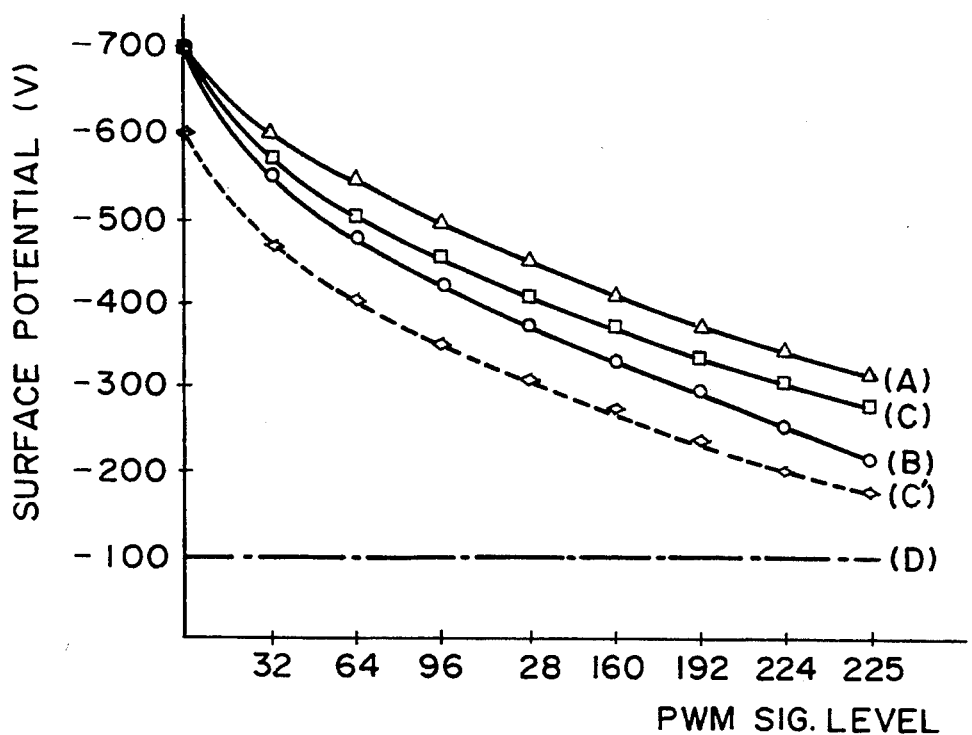
FIG. 17 shows the potential attenuation of a usual OPC photosensitive drum.

In order to avoid the influence by the light blocking by the toner, the image bearing member having the transparent conductive base was used in the foregoing experiments. Now, experiments are carried out using an OPC photosensitive drum having an aluminum base which is usually used, and the image exposure is made by a semiconductor laser. FIG. 17 shows the surface potential attenuation curve in this case. In FIG. 17, curve (A) is a surface potential attenuation curve (charge potential of 700 V) when the amount of the toner providing a toner potential of 100 V is deposited on the image bearing member. Curve (B) is a surface potential attenuation curve (charge potential of 700 V) without the toner. A curve (C') is a surface potential attenuation curve (charge potential of 600 V) on the photoconductive layer when the toner potential is 100 V. By adding to this, the toner potential of 100 V (D), the surface potential attenuation curve (charge potential of 700 V) without the light quantity reduction by the toner, is as shown in FIG. 17C. In FIG. 17, (A)–(C) (reduction of curve (B) from the curve (A)) corresponds to the reduction of the light quantity, and (C)–(B) corresponds to the influence of the toner potential.

As will be understood from the foregoing, it is desirable that when the image bearing member has a toner image, and the latent image is formed with the toner on the image bearing member, the corrections are made from the standpoint of the influence of the light quantity reduction and from the influence due to the toner potential.

The description will be made as to the correction method in this embodiment.

Figure 19:
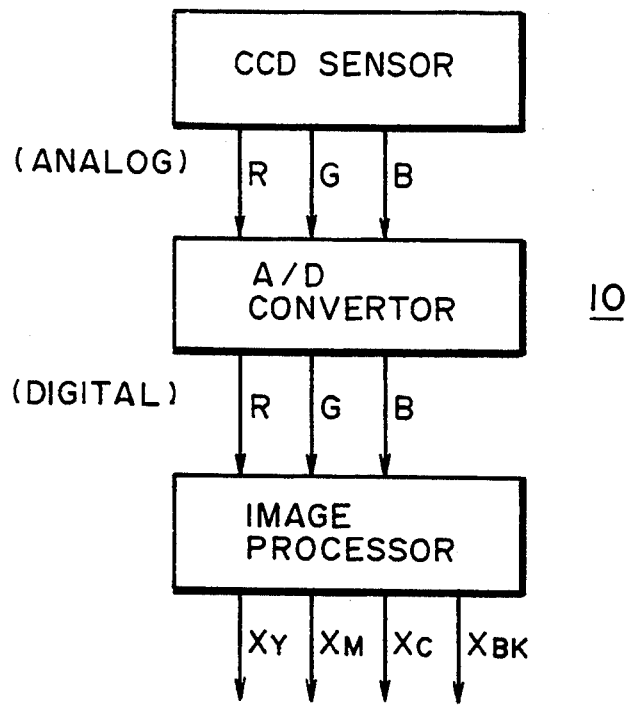
FIG. 19 schematically shows an example of a circuit of a reader used in the image forming apparatus according to an embodiment of the present invention.

As shown in FIG. 19, the image to be printed is read by the CCD sensor or the like in the reader 10 in FIG. 1, and is separated into R, G and B component signals, which are in turn transmitted to the analog-digital converter (A/D converter), where they are converted to digital signals. The R, G and B component digital signals are subjected to a known image processing in an image processor, by which they are separated into yellow component, magenta component, cyan component and black component for each of the picture elements. The thus provided yellow, magenta, cyan and black PWM signals (0–255) PY, PM, PC and PBK are produced by the reader 10 for each scan.

Figure 14:
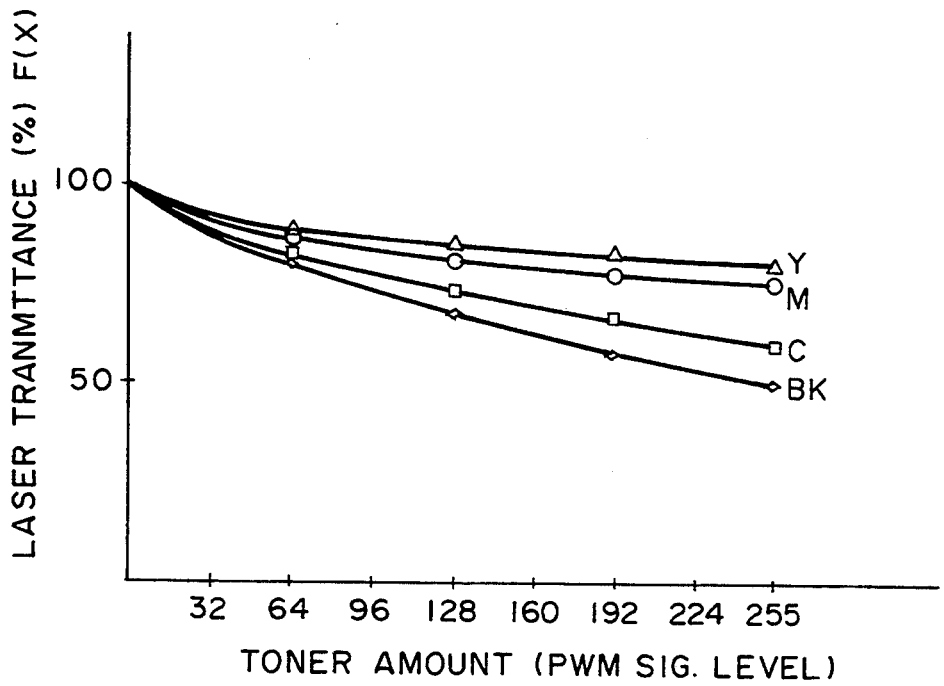
FIG. 14 shows a relation between a toner amount and a laser transmissivity.
Figure 15:
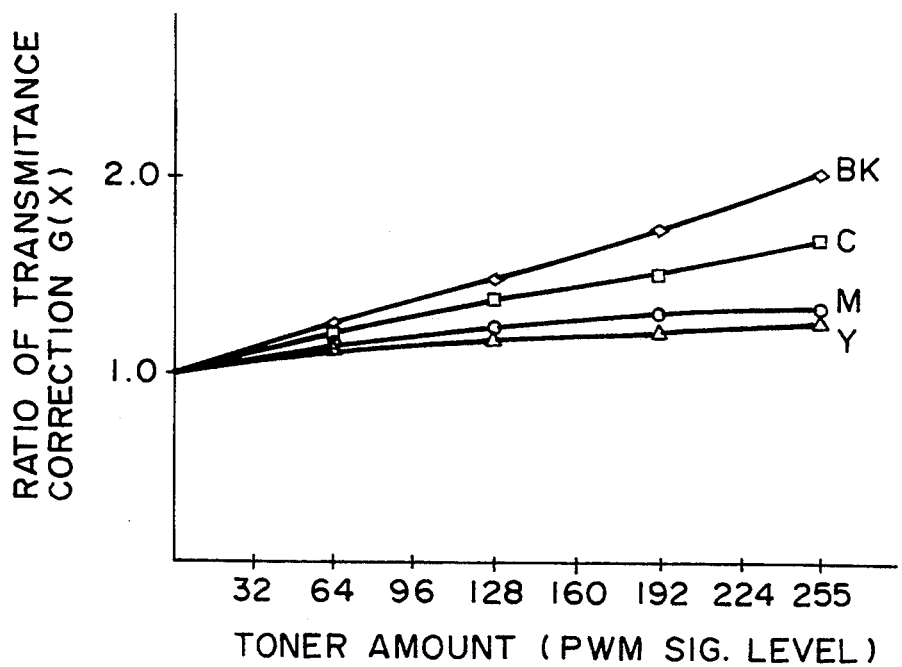
FIG. 15 shows a relation between an amount of the toner and a correction ratio for the transmitting light quantity.

The correcting term for the reduction of the light quantity will be described. The yellow, magenta, cyan and black toner quantity (PWM signal level) (0–255) are expressed as PY, PM, PC and PBK. From FIG. 14, the laser beam transmissivities (%) are F(PY), F(PM), F(PC) and F(PBK), respectively, which are functions of the toner quantity. The correcting terms for the light quantity reduction used in this embodiment will be described. First, for the yellow latent image formation, the correcting term is 1 since there is no toner on the photosensitive drum 1. For the magenta latent image formation, the yellow toner is already on the photosensitive drum 1, and therefore, the correcting term is G(PY), where G(P)=100/F(P), (see FIG. 15). For the cyan latent image formation, the image exposure is through the yellow toner and the magenta toner superposed thereon, and therefore, the correcting term is G(PY)×G(PM). Finally, for the black latent image formation, the photosensitive member is exposed through the magenta toner, the yellow toner and the cyan toner, and therefore, the correcting term is G(PY)×G(PM)×G(PC).

Figure 18:
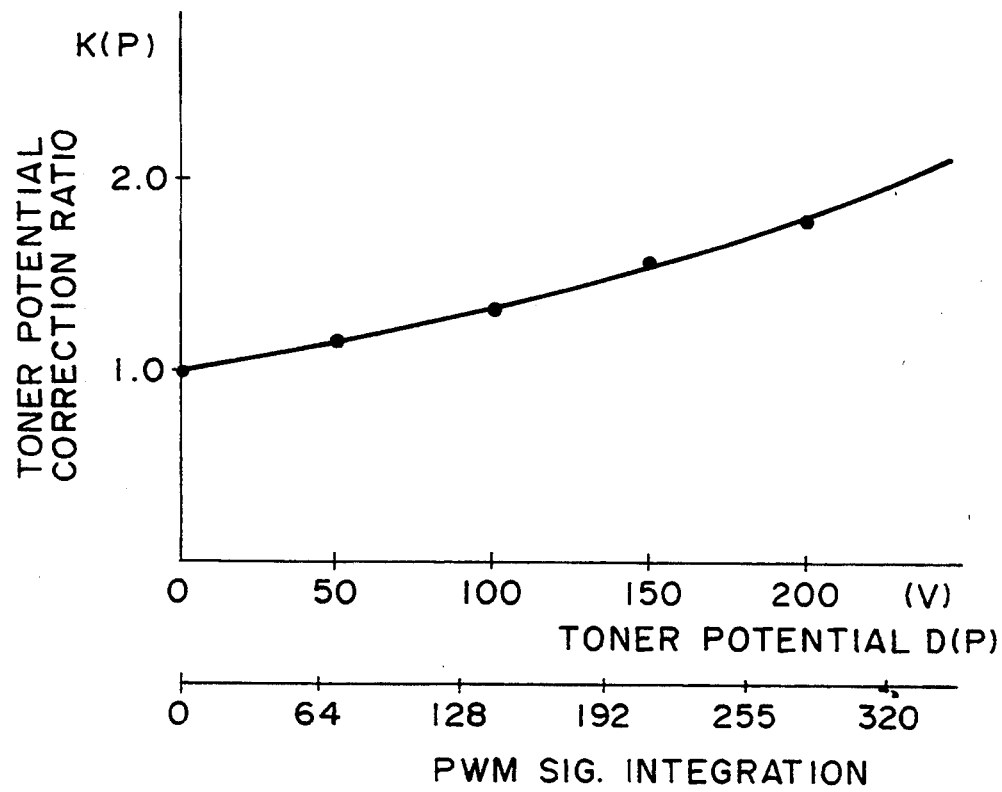
FIG. 18 shows a relation between the toner quantity (integration) and the correction ratio for the toner potential.

The description will be made as to the correcting terms for the toner potential. The deviation due to the toner potential is represented by the curve (C) minus curve (B), in FIG. 7. In order to correct this deviation, the output signal levels PY, PM, PC and PBK from the reader 10 is multiplied by correcting terms K (P) (K(X)≧1, where P is an integration of the input signal levels for the previous colors). The correcting term K (P) is a function of the toner potential D (P), as shown in FIG. 18 in these experiments. For respective colors, the correcting term is 1 for the yellow latent image formation. For the magenta latent image formation it is K (PY); for the cyan latent image formation, it is K (PY+PM); and for the black latent image formation, it is K (PY+PM+PC). By imposing such corrections on the basis of the toner potential, the deviation between the curves (C) and (C) in FIG. 17 due to the toner potential was substantially completely removed in this embodiment.

Using the correcting terms G (P) for the light quantity reduction and the correcting terms K (P) for the toner potential, the superposing development operations are carried out in the order of yellow, magenta, cyan and black colors. As for the developing method, a non-contact development method was used to avoid the toner image already formed from being scraped off. If the correcting term G(P)×K(P) which is simple product of the correcting term G (P) for the reduction of the light quantity and the correcting term K (P) for the toner potential, is used, the PWM exposure time can not be corrected in the neighborhood of P=255 (the maximum PWM exposure time), because the maximum of the PWM is 255. This embodiment has taken this into account.

EMBODIMENT 10

In this embodiment, the output of the semiconductor laser 6 in FIG. 1 during the continuous oscillation is selected slightly high, that is, 4 mW (constant). The developing parameters are set on the basis of the PWM exposure time which is 25% of the normal level. That is, when the PMW exposure time is 25%, the same image density as in the normal level can be provided. Selecting the PWM exposure time which is 25% of the normal level, the correction is possible up to the correcting term G(P)×K(P)=4. The reason why the G(P)×K(P)=4 is selected is that it has been found enough for the correction for all of the color images with the apparatus and toner of this embodiment.

The correcting equations in this embodiment are as follows, where PY, PM, PC and PBK are levels of the signals supplied from the reader 10, and RY, RM, RC and RBK are signal levels after the correction:

Output in continuous oscillation for the first color (yellow): 4 mW $$RY = INT[0.5 \times PY]$$

Output in continuous oscillation for the second color (magenta): 4 mW $$RM = INT[0.25 \times G_y(PY) \times K(PY) \times PM]$$

Output in continuous oscillation for the third color (cyan): 4 mW $$RC = INT[0.25 \times G_y(PY) \times G_m(PM) \times K\text{-}(PY+PM) \times PC]$$

Output in continuous oscillation for the fourth color (black): 4 mW $$RBK = INT[0.25 \times G_y(PY) \times G_m(PM) \times G_c(PC) \times K\text{-}(PY+PM+PC) \times PBK]$$

Here, "INT" means the minimum integer among the values in the parentheses. The integer is used because the PWM exposure signal levels are expressed as integers.

In the foregoing embodiment, the output of the semiconductor laser 6 in the continuous operation is constant (4 mW). However, this is not limiting to this embodiment.

For example, the outputs in the continuous oscillation of the semiconductor laser 6 may be changed to 1 mW, 2.5 mW, 4 mW and 4 mW for the first, second, third and fourth colors. The correcting equations in this case are as follows:

Output in continuous oscillation for the first color (yellow): 1 mW $RY = PY$

Output in continuous oscillation for the second color (magenta): 2.5 mW $RM = INT[0.4 \times Gy(PY) \times K(PY) \times PM]$ Output in continuous oscillation for the third color (cyan): 4 mW $RC = INT[0.25 \times Gy(PY) \times Gm(PM) \times K-(PY+PM) \times PC]$ Output in continuous oscillation for the fourth color (black): 4 mW $RBK = INT[0.25 \times Gy(PY) \times Gm(PM) \times Gc(PC) \times K-(PY+PM+PC) \times PBK]$ In this case, the output of the laser is made stronger with processing of the color superposition, and the exposure time is made shorter, correspondingly (the PWM exposure period is made shorter), by which the the PWM exposure amount correctable range is expanded without changing the exposure amount (laser output power × PWM exposure time).

EMBODIMENT 11

In this embodiment, the use is made with the apparatus having the structure shown in FIG. 2 and an LED (light emitting diode) array 7 emitting light having the wavelength of 666 nm as the exposure means. The used toner is, similarly to the first embodiment, a polyester toner having a particle size of 8 microns. Three toners, i.e., yellow, magenta and cyan toners are used, which are contained in three developing devices 31, 32 and 33. The toner images are developed superposedly on the photosensitive drum 1 through a non-contact developing method. By doing so, a multicolor image is provided by the color laser beam printer of an electrophotographic type.

In this embodiment, the light emitting time (period) of the LED array 7 is controlled to effect the PWM exposure. As for the correcting method, similarly to the embodiment 9, the continuous light emitting output is selected slightly high and constant. The developing parameters are selected for the PWM exposure time or period which is 25% of the normal level, and the PWM correction is effected. As a result, the advantageous effects which are equivalent to those in FIG. 9 embodiment, are provided.

EMBODIMENT 12

In the Embodiment 11, the output of the LED array 7 in the continuous light Mission is made constant (4 mW). However, in Embodiment 12, the output of the LED array in the continuous light emission is made stronger with the processing of the color superposition, and the light emission period is made shorter correspondingly. By doing so, the PWM exposure amount correctable range is expanded without changing the exposure amount. Thereafter, the PWM correction is effected. As a result, the advantageous effects are equivalent to those in Embodiment 10.

EMBODIMENT 13

In Embodiments 11 and 12, the toner images are superposed in the order of yellow, magenta and cyan colors, because the cyan and black toner hardly transmit the image exposure light having the wavelength of 665 nm provided by the LED array 7. In order to form a multi-color image by superposing four color toner images, an LED array producing the wavelength which is not less than 780 run is used to permit the transmission of the cyan toner, as in the semiconductor laser 6 in Embodiments 9 and 10. In the Embodiment 13, the LED array providing the wavelength of 780 nm is used, and the similar corrections as in the Embodiments 11 and 12 are effected. The result were satisfactory. Thus, four color superposing development is made possible using LED array as the exposure light source.

The various values in the foregoing embodiments are determined on the basis of the used toner, image bearing member, exposure means or the like, and if the natures of these elements are different, the values are changed, correspondingly. For the present, it has been understood that with the decrease of the charge amount of the developer such as toner, the toner potential decreases with the result of good advantage to the correction, and therefore, the number of tone levels of the output image can be increased. The preferable toner, therefore, has the toner charge amount of not more than 20 microcoulomb/g after the re-charging and the toner potential which is not more than 70–80 V at the maximum toner amount in a monochromatic color.

In the foregoing embodiment, the color separation image data supplied from the reader 10 are corrected in accordance with the amounts of the toners for the respective colors predicted from the data, so that the image exposure period per one picture element is changed in accordance with the toner amount. It is a possible alternative that the color separation image data supplied from the reader 10 are corrected in accordance with the toner amounts predicted from the data for the respective colors, so that the exposure strength of the image exposure per unit picture element may be changed in accordance with the toner amounts.

The description will be made as to Embodiments 14, 15 and 16 in which the image exposure strength per unit picture element is changed in accordance with the toner amount. In these embodiments, the multi-image forming apparatus having the structure as shown in FIG. 1 or 2 is used. In order to change the image exposure strength, the use is made with the pulse width modulation circuit shown in FIG. 9 and a laser driver circuit 500 shown in FIG. 8. The reader has the structure shown in FIG. 19. Therefore, the description for these elements are omitted for simplicity of explanation. The used toner is a polyester toner having a particle size of 8 microns. As for the image exposure light source, Embodiment 14 uses a semiconductor laser producing a laser beam having a wavelength of 780 nm as in Embodiments 9 and 10; Embodiment 15 uses an LED array emitting light having a wavelength of 665 nm as in Embodiments 11 and 12: and Embodiment 16 uses an LED array emitting light having a wavelength of 780 nm as in Embodiment 13. Therefore, these embodiments are the same as in FIGS. 12, 13, 14–18 in the relation between the toner amount and the potential due to the toner charge, the relation between the number of toner charging operations and the toner potential, the relation between the toner amount and the laser transmissivity, the relation between the toner amount and the transmission light amount correcting ratio, the influence of the light quantity reduction, the influence of the toner potential, the corrections against these factors and the like. Therefore, the description thereof are omitted for the same reason unless it is necessary.

EMBODIMENT 14

Embodiment 14 is incorporated in a multi-color image forming apparatus having the structure shown in FIG. 1. By correcting 8 bit laser power level, the current flowing through the semiconductor laser 6 is changed to correct the image exposure strength. In this embodiment, similarly to the foregoing embodiments, the use are made with the correcting term G (P) for the reduction of the light quantity and the correcting term K (P) for the toner potential. Multi-image was formed by superposing yellow, magenta, cyan and black colors in the order named. A non-contact developing method was used so as to avoid the already formed toner image from being scraped off.

Figure 20:
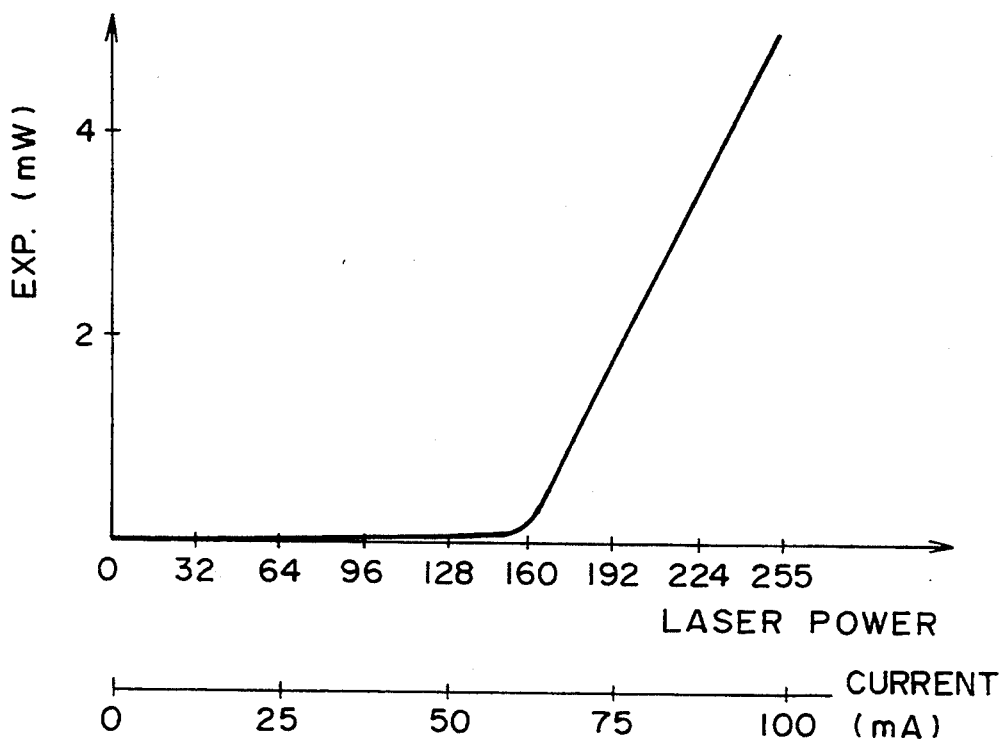
FIG. 20 shows an output property of a semiconductor laser used in a sixth embodiment of the present invention.

The semiconductor laser 6 used in this embodiment has the output property shown in FIG. 20, where B (mW) is a laser output, and A (0–255) is a laser power level. This is expressed as a equation of D=0.05 (A−160). Therefore, the corrections against the light quantity reduction attributable to the existence of the toner image on the image bearing member and against the influence of the toner potential, are as follows.

It is assumed that the laser power level after the correction is A", and the laser output level is B" (mW) after the correction. The correcting term is G(P)×K(P), where G (P) is the correcting term against the reduction of the light quantity, and K (P) is the correcting term against the toner potential. Then, $$B'' = G(P) \times K(P) \times B$$

therefore, the laser power level correcting equation is:

$$A'' = B(P) \times K(P) \times (A-160) + 160$$

In this embodiment, the laser power level is corrected for each of the picture elements, as follows:

First color (yellow) latent image formation:

$$A''Y = A$$

Second color (magenta) latent image formation:

$$A''M = INT[G(PY) \times K(PY) \times (A-160) + 160]$$

Third color (cyan) latent image formation:

$$A''C = INT[G(PY) \times G(PM) \times K(PY+PM) \times (A-160) + 169]$$

Fourth color (black) latent image formation:

$$A''BK = INT[G(PY) \times G(PM) \times G(PC) \times K(PY+PM+PC) \times (A-160) + 160]$$

Where, "INT" means a minimum integer among the values in the parentheses []. The reason why the integers are used is that the laser power levels are expressed as integers.

In this embodiment, the laser power level before the correction is 180 (1 mW of the exposure strength), and therefore, the correcting equations are as follows:

First color (yellow) latent image formation:

$$A''Y = 180$$

Second color (magenta) latent image formation:

$$A''M = INT[G(PY) \times K(PY) \times 20 + 160]$$

Third color (cyan) latent image formation:

$$A''C = INT[G(PY) \times G(PM) \times K(PY+PM) \times 20 + 169]$$

Fourth color (black) latent image formation:

$$A''BK = INT[G(PY) \times G(PM) \times G(PC) \times K(PY+PM+PC) \times 20 + 160]$$

By the image exposure strength correction for each of the picture elements, the proper latent image formation is achieved irrespective of the existence or absence of the toner.

EMBODIMENT 15

Embodiment 15 is incorporated in the multi-color image forming apparatus shown in FIG. 2, and the use is made with an LED array emitting light having a wavelength of 665 nm as in Embodiment 11 and 12 and polyester toner particles having a particle size of 8 microns (three toners, i.e., yellow, magenta and cyan toners) as in Embodiments 11 and 12. They are contained in three developing devices 31, 32 and 33. A non-contact development is used to superpose three color toner images on the photosensitive drum 1 in the order named, to provide the multi-color image. The reason why the yellow, magenta and cyan toners are superposed in this order is that the cyan toner hardly transmits the light having the wavelength of 665 nm by the LED array, while the transmissivities of the yellow toner and the magenta toner are substantially equivalent to those for the semiconductor laser. Therefore, in this embodiment, the image exposure means in the form of the LED array provides 17 tone levels by dithering method as 4×4 picture elements. Therefore, as one picture element, it is a hi-level toner image. Therefore, the correcting method in this embodiment is also includes the correction at the two levels, that is, for the toner present portion and for the toner absent portion. In the LED array used in this embodiment, B (mW)=1.2×10−3×A, where B is exposure output, and A (mW) is the current level for the LED light emission. An input signal Q from the scanner for each of the picture elements takes 1 for the picture element to be exposed and 0 for the picture element not to be exposed.

In a unit picture element, the toner image is hi-level, and therefore, the light transmissivity for each of the color for the toner present portion is constant. The transmissivities H for the respective colors in this embodiment are as follows:

Yellow: $HY = 0.85$ (85%)
Magenta: $HM = 0.80$ (80%)
Cyan: $HC = 0.10$ (10%)

The correcting term for the light quantity reduction for the yellow latent image formation is 1 since there is no toner on the image bearing member. For the magenta latent image formation, there is an yellow toner image on the image bearing member, and therefore, the correcting term is:

$$[1-(1-1/0.85)QY]$$

Therefore, the correcting equation is $(1+0.176QY)$, where QY is 1 or 0. For the cyan latent image formation, there are already yellow and magenta toner images, and therefore, the correcting term is:

$$(1+0.176QY) \times (1+0.25QM)$$

The description will be made as to the correcting term against the influence of the toner potential. When the multi-color image is formed by superposing yellow, magenta and cyan colors are superposed in a bi-level image, the correction is required when the yellow toner is already formed during the magenta latent image formation or when one or both of the yellow toner and magenta toner images are already on the image bearing member during the cyan latent image formation. As described hereinbefore, there is no substantial difference in the toner potential depending on the color, and therefore, the considerations for the determination of the correcting terms may be made only for the case where one color toner is already deposited and the case where two color toners are deposited. The following corrections have been found desirable when the toner and the LED or the like are the ones used in this embodiment. More particularly, the correcting term when one color is deposited is 1.6, and the correcting term when two color toners are deposited is 2.2.

The correcting terms for the respective color latent image formations will be expressed using the input signals QY, QM and QC. For the yellow latent image formation, the correcting term is 1 because there is no toner on the image bearing member. For the magenta latent image formation, there is already yellow toner image on the image bearing member, and therefore, the correcting term is $1+0.6QY$ (it is 1 when QY=0, and it is 1.6 when QY=1). For the cyan latent image formation, there are already yellow and magenta toner images, and therefore, the correcting term is $[1+0.6(QY+QM)]$, that is, when QY+QM=0, it is 1; and when QY+QM=1, it is 1.6; and when QY+QM=2, it is 2.2.

Three color images are formed by superposing the yellow, magenta and cyan images formed with the correcting terms against the light quantity reduction and the toner potential obtained in the manner described above.

There is a proportional relation of $B = 1.2 \times 10^{-3} \times A$, where B (mW) is the exposure strength of the LED array, and A (mW) is the current level through the LED array. Therefore, the exposure strength B can be corrected with the correcting ratio which is similar to the correcting ratio for the current level A through the LED. In this embodiment, the current level through the LED is corrected for each of the picture elements in the following manner, where A" is the current level after the correction.

First color (yellow) latent image formation:

$$A''Y = A$$

Second color (magenta) latent image formation:

$$A''M = (1+0.176QY) \times (1+0.6WY) \times A$$

Third color (cyan) latent image formation:

$$A''C = (1+0.176QY) \times (1+0.25QM) \times [1+0.6(QY+QM)] \times A$$

By the image exposure strength correction for each of the picture elements described above, the proper latent images can be formed irrespective of the presence or absence of the toner.

EMBODIMENT 16

In the foregoing embodiment 15, the toner images are superposed in the order of yellow, magenta and cyan colors, because the cyan and black toners hardly transmit the image exposure light provided by the LED array, having the wavelength of 665 nm. In order to accomplish a multi-color image formation by superposing four color toner images, the wavelength of the LED array may be made not less than 780 nm, similarly to the case of the semiconductor laser so as to permit transmission through the cyan toner powder. Therefore, in Embodiment 16, an LED array emitting light having a wavelength of 780 nm is used, and the correcting terms are determined in same manner as in Embodiment 15. Then, satisfactory images are provided, so that the four color superposing development is made possible using an LED array as the image exposure source.

The various values in the foregoing embodiments are determined on the basis of the used toner, image bearing member, exposure means or the like, and if the natures of these elements are different, the values are changed correspondingly. The application of the present invention is not limited to the multi-color image forming apparatus, but also to various types of color printer, color copying machine or other multi-color image forming machines, or to a color printer, color copying machine or another multi-color image forming apparatus of non-electrophotographic type. The pulse width modulation circuit and the laser driver circuit or the like, the circuit elements used and parts or the like may be properly changed by one skilled in the art.

According to Embodiments 9–16, both of the influence by the light blocking by the developer such as toner on the image bearing member and the influence by the amount of charge of the developer, are taken into consideration. The color separation image data supplied are corrected in the exposure period in accordance with the toner amounts for the colors predicted by the data in consideration of the deviation of the surface potential attenuation curve due to the presence or absence of the developer, attributable to the reduction of the exposure amount due to the developer on the image bearing member and the influence of the charge amount of the developer. In this manner, the exposure period for each of the picture element is changed. Otherwise, the exposure strength is corrected, so that the exposure strength for each of the picture elements is changed. Therefore, the color reproducibility is remarkably improved, so that the characters and lines or other fine portions can be clearly reproduced.

While the invention has been described with reference to the structures disclosed herein, it is not confined to the details set forth and this application is intended to cover such modifications or changes as may come within the purposes of the improvements or the scope of the following claims.

What is claimed is:

1. A color electrophotographic apparatus, comprising:
   a photosensitive member;
   scanning means for scanning said photosensitive member, after being charged, with image light in accordance with color information;

developing means for developing said photosensitive member scanned by said scanning means with toner of a corresponding color;

wherein said scanning means and said developing means are operated a plurality of times to form a plurality of toner images on said photosensitive member;

control means for controlling a quantity of light onto said photosensitive member from said scanning means, wherein after a first of said toner images are formed, said control means controls the quantity of the light on a basis of a potential of the toner images on said photosensitive member.

2. An apparatus according to claim 1, wherein said control means further controls the quantity of the light on a basis of light transmittance of the toner images on said photosensitive member.

3. An apparatus according to claim 1, wherein the potential of the toner images is determined by an amount of the toner.

4. An apparatus according to claim 3, wherein the amount of the toner is determined by input information to said scanning means.

5. An apparatus according to claim 1, wherein said control means controls a quantity of the light per unit pixel.

6. An apparatus according to claim 1, wherein said developing means has a plurality of developing devices for different colors.

7. An apparatus according to claim 1, wherein said plurality of the toner images formed on said photosensitive member is transferred all at once to a recording material.

* * * * *

UNITED STATES PATENT AND TRADEMARK OFFICE
CERTIFICATE OF CORRECTION

PATENT NO. : 5,341,165
DATED : August 23, 1994
INVENTOR(S) : Hiroyuki Suzuki, et al.

It is certified that error appears in the above-identified patent and that said Letters Patent is hereby corrected as shown below:

Column 1, line 7, change "invention" to --invention relates--.

Column 3, line 48, change "hi-level," to --bi-level--.

Column 4, line 15, change "chart-" to --charg- --; and
line 58, change "machine" to --machines--.

Column 5, line 5, change "lamp" to --lamp 8--;
line 31, change "mutation" to --modulation--;
line 38, insert --and-- before "is"; and
line 61, change "product" to --produce--.

Column 6, line 1, change "the twice" to --twice the--; and
line 7, change "ECL levels (0-1 V)," to --ECL levels (0 - -1V),--.

Column 7, line 8, change "Fbk(Xbk)X5.9" to --Fbk(Xbk) = 5.9--; and
line 48, change "B=[[F(X)]100]XB"." to --B = [[F(X)]/100] x B".--

UNITED STATES PATENT AND TRADEMARK OFFICE
CERTIFICATE OF CORRECTION

PATENT NO. : 5,341,165
DATED : August 23, 1994
INVENTOR(S) : Hiroyuki Suzuki, et al.

It is certified that error appears in the above-identified patent and that said Letters Patent is hereby corrected as shown below:

Column 8, line 4, change "+ 160" to --+ 160]--;
                  line 24, change "+ 160" to --+ 160]--; and
                  line 51, change "digial" to --digital--.

Column 9, line 20, "160]for" to --160] for--;
                  line 28, change "te" to --the--;
                  line 31, change "665 run," to --665 nm,--; and
                  line 67, change "B"]1-(1-100/H)XQ]XB." to --B" = [1-(1-100/H)XQ]XB,--.

Column 10, line 5, change "A"y-A" to --A"y = A--;
                  line 12, change "S"C=" to --A"c=--; and
                  line 63, change "780 run" to --780 nm--.

Column 11, line 40, change "levels (0-225)" to --levels (0-255)--.

Column 12, line 20, change "Pbk" to --Pbk]--;
                  line 46, change "Pbk" to --Pbk]--; and
                  line 55, change "ment." to --ments.--.

UNITED STATES PATENT AND TRADEMARK OFFICE
CERTIFICATE OF CORRECTION

PATENT NO. : 5,341,165

DATED : August 23, 1994

INVENTOR(S) : Hiroyuki Suzuki, et al.

It is certified that error appears in the above-identified patent and that said Letters Patent is hereby corrected as shown below:

Column 14, line 1, change "and" to --an--;
      line 15, change "element" to --elements--;
      line 46, change "this" to --these--;
      line 64, change "780 run," to --780 nm,--; and
      line 67, change "780 Dan." to --780 nm.--.

Column 15, line 19, change "first-eighth" to --first to eighth--;
      line 30, change "FIG. 7A," to --In FIG. 7A,--;
      line 44, change "is different" to --being different--; and
      line 52, change "780 run." to --780 nm.--.

Column 16, line 43, change "curve (C)." to --curve (C').--; and
      line 67, change "FIG. 17C." to --FIG. 17--.

UNITED STATES PATENT AND TRADEMARK OFFICE
CERTIFICATE OF CORRECTION

PATENT NO. : 5,341,165
DATED : August 23, 1994
INVENTOR(S) : Hiroyuki Suzuki, et al.

It is certified that error appears in the above-identified patent and that said Letters Patent is hereby corrected as shown below:

Column 17, line 53, change "is" to --are--; and
              line 64, change "curves (C) and (C)" to --curves (C) and (C')--.

Column 19, line 54, change "Mission" to --emission--.

Column 20, line 5, change "780 run" to --780 nm--; and
              line 10, change "result" to --results--.

Column 21, line 1, change "are" to --is--; and
              line 51, change "+169]" to --+160]--.

Column 22, line 8, change "+169]" to --+160]--;
              line 23, change "Embodiment 11" to --Embodiments 11--;
              line 40, change "hi-level" to --bi-level--;
              line 41, delete "is";
              line 45, change "(mW)=1.2x10-3xA," to --(mW)=$1.2 \times 10^{-3} \times A$,--;
              line 52, change "hi-level" to --bi-level--;
              line 53, 4, change "color" to --colors--; and
              line 63, change "an" to --a--.

UNITED STATES PATENT AND TRADEMARK OFFICE
CERTIFICATE OF CORRECTION

PATENT NO. : 5,341,165
DATED : August 23, 1994
INVENTOR(S) : Hiroyuki Suzuki, et al.

It is certified that error appears in the above-identified patent and that said Letters Patent is hereby corrected as shown below:

Column 23, line 6, change "0.25QM" to --0.25QM)--;
line 10, delete "are superposed";
line 25, change "color" to --color toner--; and
line 62, change "(1+0.6WY)" to --(1+0.6QY)--.

Column 24, line 50, change "element" to --elements--.

Column 25, line 10, change "are" to --is--; and
line 12, change "the light" to --a light-- and change "a basis" to --the basis--.

Signed and Sealed this

Fourteenth Day of February, 1995

Attest:

BRUCE LEHMAN

*Attesting Officer*       *Commissioner of Patents and Trademarks*